United States Patent
Tsujimoto

(10) Patent No.: US 9,001,356 B2
(45) Date of Patent: *Apr. 7, 2015

(54) MULTIFUNCTION PRINTER, MULTIFUNCTION PRINTER CONTROL SYSTEM, AND RECORDING MEDIUM

(75) Inventor: Kunihiko Tsujimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 967 days.

This patent is subject to a terminal disclaimer.

(21) Appl. No.: 12/962,347

(22) Filed: Dec. 7, 2010

(65) Prior Publication Data

US 2011/0134456 A1    Jun. 9, 2011

(30) Foreign Application Priority Data

Dec. 8, 2009 (JP) ................................. 2009-278820

(51) Int. Cl.
*G06F 3/12* (2006.01)
*H04N 1/00* (2006.01)
*H04N 1/44* (2006.01)

(52) U.S. Cl.
CPC ....... *H04N 1/00204* (2013.01); *H04N 1/00244* (2013.01); *H04N 1/00464* (2013.01); *H04N 1/00514* (2013.01); *H04N 1/4413* (2013.01);
(Continued)

(58) Field of Classification Search
CPC .................. H04N 1/00244; H04N 2201/001; H04N 1/00973; H04N 1/00214; H04N 1/00464
USPC ........................................................ 358/1.15
See application file for complete search history.

(56) References Cited

U.S. PATENT DOCUMENTS 6,313,921 B1    11/2001  Kadowaki
2002/0136559 A1*  9/2002  Simpson et al. ................. 399/9
(Continued)

FOREIGN PATENT DOCUMENTS

CN    1495579 A    5/2004
CN    1749997 A    3/2006
(Continued)

OTHER PUBLICATIONS

The MFP solution by Endo et al.; Publisher: OKI Technical Review; Date: Apr. 2004; Issue 194 vol. 70 No. 2.
(Continued)

*Primary Examiner* — Marivelisse Santiago Cordero
*Assistant Examiner* — Kent Yip
(74) *Attorney, Agent, or Firm* — Keating & Bennett, LLP

(57) ABSTRACT

A multifunction printer includes a display section, a web browser section for operating in accordance with software for a web browser, and a second web server section for operating in accordance with software for a web server. The web browser section causes the display section to display an operation window indicated by image data received from a first web server section, and notifies the second web server section of a control instruction to control the multifunction printer, which instruction is entered into the operation window. The multifunction printer further includes a device control section for controlling the multifunction printer in accordance with the control instruction of which the web browser section notifies the second web server section. This allows controlling the multifunction printer via the operation window received from an information processing apparatus even when a firewall is constructed between the information processing apparatus and the multifunction printer, and also allows easily customizing the operation window.

12 Claims, 10 Drawing Sheets

(52) U.S. Cl.
CPC ...... *H04N 1/4433* (2013.01); *H04N 2201/0039* (2013.01); *H04N 2201/0094* (2013.01)

(56) References Cited

U.S. PATENT DOCUMENTS

| | | |
|---|---|---|
| 2003/0043272 A1 | 3/2003 | Nagao et al. |
| 2004/0054904 A1 | 3/2004 | Matsuya |
| 2004/0075857 A1 | 4/2004 | Akiyoshi et al. |
| 2004/0130747 A1 | 7/2004 | Ohishi et al. |
| 2004/0205176 A1 | 10/2004 | Ting et al. |
| 2004/0215671 A1* | 10/2004 | Hyakutake et al. ............ 707/203 |
| 2005/0027820 A1* | 2/2005 | O'Laughlen et al. ......... 709/217 |
| 2005/0046887 A1 | 3/2005 | Shibata et al. |
| 2005/0108353 A1 | 5/2005 | Yamamoto |
| 2006/0026434 A1 | 2/2006 | Yoshida et al. |
| 2006/0059462 A1 | 3/2006 | Yamamoto |
| 2006/0061813 A1 | 3/2006 | Kuroda et al. |
| 2006/0103666 A1 | 5/2006 | Kita |
| 2006/0110171 A1* | 5/2006 | Miyazawa et al. ................ 399/8 |
| 2007/0159663 A1 | 7/2007 | Tsujimoto |
| 2007/0255428 A1 | 11/2007 | Nagata |
| 2008/0027569 A1 | 1/2008 | Okigami |
| 2008/0098221 A1 | 4/2008 | Hashimoto et al. |
| 2008/0120408 A1 | 5/2008 | Kim |
| 2008/0150952 A1 | 6/2008 | Koarai |
| 2009/0091782 A1 | 4/2009 | Okamoto et al. |
| 2010/0053676 A1 | 3/2010 | Sugimoto |
| 2010/0122319 A1 | 5/2010 | Nakashima |
| 2011/0252117 A1 | 10/2011 | Sng et al. |

FOREIGN PATENT DOCUMENTS

| | | |
|---|---|---|
| CN | 1776543 A | 5/2006 |
| CN | 101115116 A | 1/2008 |
| CN | 101237499 A | 8/2008 |
| JP | 2003-69988 A | 3/2003 |
| JP | 2004-086765 A | 3/2004 |
| JP | 2005-080018 A | 3/2005 |
| JP | 2005-149320 A | 6/2005 |
| JP | 2006-092182 A | 4/2006 |
| JP | 2006-135890 A | 5/2006 |
| JP | 2006-252135 A | 9/2006 |
| JP | 2007-134814 A | 5/2007 |
| JP | 2007-174400 | 7/2007 |
| JP | 2007-208910 A | 8/2007 |
| JP | 2008-083740 A | 4/2008 |
| JP | 2008-269530 A | 11/2008 |
| JP | 2009-116890 A | 5/2009 |
| JP | 2010-113599 A | 5/2010 |

OTHER PUBLICATIONS

Notice of Allowance and Fee(s) Due issued Jun. 5, 2013 in connection with U.S. Appl. No. 13/093,598.
Office Action mailed Feb. 5, 2013 in connection with related U.S. Appl. No. 12/928,118.
Office Action dated Oct. 23, 2012 issued in connection with U.S. Appl. No. 12/928,118.
Office Action mailed Jan. 11, 2013 in U.S. Appl. No. 13/093,598.
U.S. Appl. No. 12/928,118, filed Dec. 2, 2010.

* cited by examiner

FIG. 4

```
<html>
 <body>
  <h2>document managing application</h2>
  <form name="Auth" method="post" action="http://123.123.123.123/app/auth">
   <p>login name:<input type="text" name="login_name" size="50"></p>
   <p>password:<input type="password" name="password" size="50"></p>
   <input type="submit" value="login">
   <input type="reset" value="reset">
  </form>
 </body>
</html>
```

FIG. 5 document managing application login name: ☐ password: ☐

[login] [reset]

FIG. 6

```
<html>
 <body>
  <h2>document managing application</h2>
  <form name="scan" method="post" action="http://127.0.0.1/scan/execscan">
   <p>place document and press scan button<p/>
   <br>
   <br>
   <br>
   <div align="right"><input type="submit" value="scan"></div>
  </form>
 </body>
</html>
```

FIG. 7 document managing application place document and press scan button

[ scan ]

FIG. 8

```
HTTP/1.1 302 Found
Date: MON, 31 Aug 2009 12:00:00 GMT
Server: Apache/1.4 (Unix)
Location: http://123.123.123.123/app/status.html?op=started
Content-Type: text/html; charset=utf-8
```

FIG. 9

```
<html>
 <body>
   <h2>document managing application</h2>
   <BR><BR>
   <p>scan is in progress<p/>
   <p>please wait awhile<p/>
 </body>
</html>
```

FIG. 10 document managing application scan is in progress please wait awhile

MULTIFUNCTION PRINTER, MULTIFUNCTION PRINTER CONTROL SYSTEM, AND RECORDING MEDIUM

This Nonprovisional application claims priority under 35 U.S.C. §119(a) on Patent Application No. 2009-278820 filed in Japan on Dec. 8, 2009, the entire contents of which are hereby incorporated by reference.

TECHNICAL FIELD

The present invention relates to a multifunction printer control system in which a multifunction printer and an information processing apparatus operate in combination.

BACKGROUND ART

Conventionally, there has been known a multifunction printer having a plurality of functions such as a copy function, a scan function, a print function, and a FAX sending and receiving function in combination. Recently, such a multifunction printer has been connected with a PC (personal computer) etc. via a communications network and carries out various processes. That is, an application running on a PC and a function of a multifunction printer are combined with each other so that the multifunction printer operates as a part of a total application system. This allows easily constructing a flexible service in which a function of the multifunction printer and a function of the PC are combined with each other appropriately.

In order to construct such a service, Patent Literature 1 discloses a multifunction printer including an external API section having a function of receiving data including an image process request, converting the data into a command corresponding to an API (Application Program Interface) of a control layer, and sending the command to the control layer.

Further, Patent Literature 2 discloses a multifunction printer control system including a multifunction printer and a control device for transmitting a control instruction to the multifunction printer via a communications network. In this multifunction printer control system, data of an operation window is transmitted from the control device to the multifunction printer with use of HTTP. In response to an instruction entered via the operation window, the control device transmits a control command to the multifunction printer with use of SOAP, and the multifunction printer carries out a function corresponding to the control command.

CITATION LIST

Patent Literatures

[Patent Literature 1]
Japanese Patent Application Publication No. Tokukai 2005-80018 (published on Mar. 24, 2005)
[Patent Literature 2]
Japanese Patent Application Publication No. Tokukai 2007-174400 (published on Jul. 5, 2007)
[Patent Literature 3]
Japanese Patent Application Publication No. Tokukai 2005-149320 (published on Jun. 9, 2005)

SUMMARY OF INVENTION

Technical Problem

However, the techniques described in Patent Literatures 1 and 2 have a problem that in a case where a firewall is constructed between an external PC (or control device) and a multifunction printer, a command from the external PC (or control device) is blocked by the firewall, which prevents control of the multifunction printer.

In order to deal with this problem, Patent Literature 3 describes that when a multifunction printer serving as an image processing apparatus displays via a web browser an image based on an HTML document retrieved from an external PC, icons and messages unique to the multifunction printer are also displayed. With this configuration, pressing an icon unique to the multifunction printer allows controlling a function of the multifunction printer without requiring an operation via the external PC.

However, in the technique of Patent Literature 3, the web browser is subjected to a unique extension specialized for the multifunction printer, in order that an icon, etc. unique to the multifunction printer is displayed. For this reason, in the case of use of a general-purpose web browser in particular, such a unique extension must be applied every time the version of the web browser is upgraded or a glitch, etc. with the web browser is fixed. This causes a great reduction in efficiency of maintenance.

Furthermore, in cases where the need arises for customizing an operation window containing an icon, etc. that is displayed as a result of such a unique extension as described above, it is necessary to remediate a program containing the web browser for each multifunction printer. This requires a very great deal of effort and time.

The present invention was made in view of the foregoing problems. An object of the present invention is to provide a multifunction printer which can be controlled from an information processing apparatus even when a firewall is constructed between the information processing apparatus and the multifunction printer.

Solution to Problem

In order to solve the foregoing problems, a multifunction printer of the present invention is a multifunction printer, which communicates via a communications network with an information processing apparatus including a first web server section which operates in accordance with software for a web server, the multifunction printer comprising: a web browser section for operating in accordance with software for a web browser; and a second web server section for operating in accordance with software for a web server, the web browser section receiving, from the first web server section, control information for notifying the second web server section of a control instruction to control the multifunction printer, and upon reception of the control information from the first web server section, the web browser section carrying out a notification process of notifying the second web server section of the control instruction, the multifunction printer further comprising a control section for controlling the multifunction printer in accordance with the control instruction received by the second web server section.

Advantageous Effects of Invention

With the arrangement, it is possible to control the multifunction printer via the operation window received from the information processing apparatus even when a firewall is constructed between the information processing apparatus and the multifunction printer.

BRIEF DESCRIPTION OF DRAWINGS

FIG. 4 is a drawing showing an example of HTML data sent in S12 of FIG. 3.

FIG. 5 is a drawing showing an example of a window based on HTML data shown in FIG. 4.

FIG. 6 is a drawing showing an example of HTML data sent in S15 of FIG. 3.

FIG. 7 is a drawing showing an example of a window based on HTML data shown in FIG. 6.

FIG. 8 is a drawing showing an example of data of redirect sent in S19 of FIG. 3.

FIG. 9 is a drawing showing an example of HTML data sent in S21 of FIG. 3.

FIG. 10 is a drawing showing an example of a window based on HTML data shown in FIG. 9.

DESCRIPTION OF EMBODIMENTS

One embodiment of the present invention is explained below with reference to FIGS. 1-14. The following explains one embodiment of a multifunction printer control system of the present invention.

Figure 1:
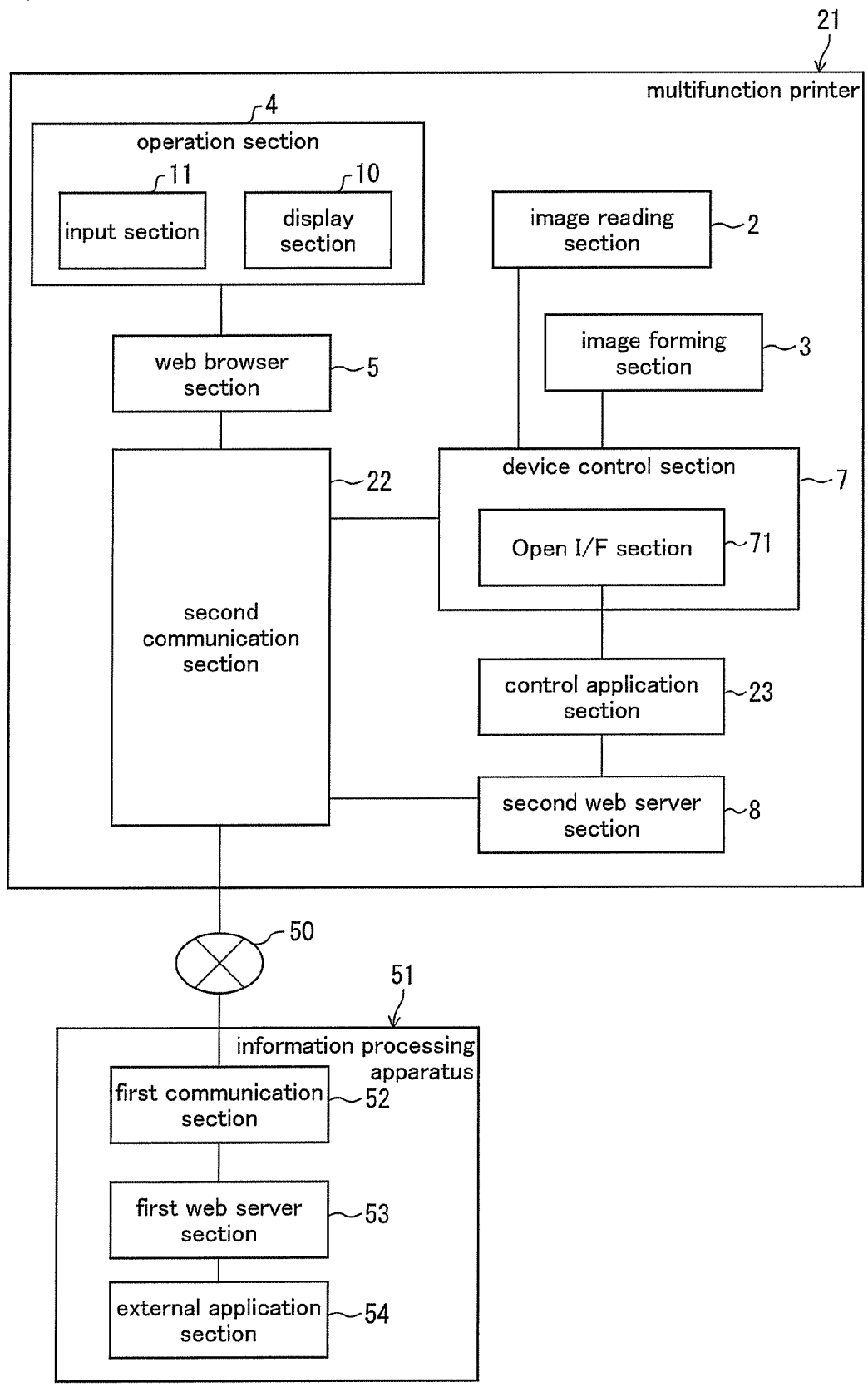
FIG. 1 is a drawing showing a configuration of a multifunction printer control system in accordance with one embodiment of the present invention.

FIG. 1 is a drawing showing a configuration of a multifunction printer control system in accordance with the present embodiment. As shown in FIG. 1, the multifunction printer control system in accordance with the present embodiment includes a multifunction printer 21 and an information processing apparatus 51. The multifunction printer 21 and the information processing apparatus 51 are connected with each other via a communications network 50. Needless to say, a plurality of multifunction printers 21 may be included in the system, and a plurality of information processing apparatuses 51 may be included in the system.

A usable example of the communications network 50 via which the multifunction printer 21 and the information processing apparatus 51 are connected with each other is the Internet, a telephone line, a serial cable, or other communication line such as a cable line or a wireless line. The multifunction printer 21 and the information processing apparatus 51 communicate with each other with use of HTTP (Hypertext Transfer Protocol) used for communications between a web server and a web browser (e.g. request and transmission of a web page).

The multifunction printer 21 receives control information in HTML format from the information processing apparatus 51 with use of HTTP. The multifunction printer 21 carries out various functions thereof (e.g. scan function, print function, and communication function) based on the received control information.

For example, the multifunction printer 21 receives HTML (Hypertext Markup Language) data indicative of an operation window from the information processing apparatus 51, and displays the operation window indicated by the HTML data. Then, the multifunction printer 21 carries out various functions corresponding to instructions entered via the operation window.

Alternatively, the multifunction printer 21 may carry out various functions thereof (e.g. scan function, print function, communication function) by carrying out a control command described in Java® script in control information received from the information processing apparatus 51.

The information processing apparatus 51 is a computer including a processing section such as a CPU and a special processor and a storage section such as a RAM, a ROM, and a HDD, and serves as a web server apparatus for a plurality of multifunction printers 21. As shown in FIG. 1, the information processing apparatus 51 includes a first communication section 52, a first web server section 53, and an external application section 54.

The first communication section 52 communicates with the multifunction printer 21 via a LAN, an Internet line, or etc. Further, the first communication section 52 communicates with the multifunction printer 21 with use of an HTTP communication protocol.

The first web server section 53 operates in accordance with software for a web server. The web server used herein indicates software which provides a function of a server apparatus constituting WWW (World Wide Web) which is an information system on the Internet. The first web server section 53 receives a request (HTTP request here) from the multifunction printer 21 via the first communication section 52, and transmits a response such as a file, image data, print data, control information etc. corresponding to the HTTP request to the multifunction printer 21 via the first communication section 52.

The external application section 54 is a block which carries out an operation in accordance with a predetermined web application in response to an instruction from the first web server section 53. That is, the external application section 54 carries out an operation in accordance with a web application running on the web server. An example of the web application is a custom application described in Java® script and is an application which runs in a Java® runtime environment.

For example, when a request (HTTP request) from the multifunction printer 21 is a request to transmit an operation window, the external application section 54 carries out an operation in accordance with an operation window transmission application. Specifically, the external application section 54 reads out from a storage section HTML data indicative of an operation window which is requested in the transmission request, and transmits the HTML data to the first web server section 53.

Further, when a request from the multifunction printer 21 is a request to transmit print data, the external application section 54 carries out an operation in accordance with a print application. Specifically, the external application section 54 retrieves, from a folder whose name is indicated in the transmission request, print data having a designated file name, and transmits the print data to the first web server section 53.

Further, when a request from the multifunction printer 21 is a request for user authentication, the external application section 54 carries out an operation in accordance with an authentication application. Specifically, the external application section 54 carries out an authentication process with use of a user name, password etc. indicated in the authentication request, generates HTML data indicative of an operation window corresponding to the result of the authentication, and transmits the HTML data to the first web server section 53.

In the present embodiment, when the external application section 54 controls a function of the multifunction printer 21 (e.g. scan function, print function), the external application section 54 transmits, to a web browser section 5 of the multifunction printer 21, an HTTP response for changing an address to be accessed by the web browser section 5 to that of the second web server section 8 in the multifunction printer 21. Consequently, the multifunction printer 21 can control various functions not in accordance with a control command from the information processing apparatus 51 having the external application section 54 but in accordance with a control command from a control application section 23 in the multifunction printer 21. Consequently, even when a firewall which blocks communications of a control command exists between the multifunction printer 21 and the information processing apparatus 51, the multifunction printer 21 can normally control various functions in response to user's instructions entered via the operation window received from the information processing apparatus 51.

For example, the external application section 54 has written beforehand, in HTML data to be transmitted to the multifunction printer 21, a loop-back address for the second web server section 8 in the multifunction printer 21 to be accessed when a button for executing a function of the multifunction printer 21 (e.g. scan function, print function, communication function) is pressed on an operation window indicated by the HTML data. The loop-back address is a virtual IP address assigned to a loop-back interface such as a network card (e.g. hardware responsible for the function of a communication section) and is an IP address indicative of a multifunction printer including the network card. The loop-back address is a publicly known technique used in a general web browser.

Alternatively, the external application section 54 may transmit, to the multifunction printer 21, a response (HTTP response) including an instruction to change URL with use of HTTP redirect in order to access a second web server section 8 in the multifunction printer 21. HTTP redirect is one of responses from a web server in HTTP, and is a function for informing a change in URL. HTTP redirect is a publicly known function used in a general web browser.

The following describes a configuration of the multifunction printer 21. The multifunction printer 21 is an apparatus capable of executing a plurality of functions such as a scan function, a print function, a facsimile sending and receiving function, and an image data sending function. It should be noted that the following description explains the scan function and the print function, which are the main functions of the multifunction printer 21, and omits to explain the other functions.

As shown in FIG. 1, the multifunction printer 21 includes an operation section 4, an image reading section 2, an image forming section 3, a web browser section 5, a second communication section 22, a device control section (control section) 7, the second web server section 8, and the control application section (control section) 23.

The operation section 4 is a user interface which informs a user of information and via which the user enters instructions. The operation section 4 includes a display section 10 such as a liquid crystal display and an input section 11 having a plurality of input keys. The operation section 4 may be a touch panel in which the display section 10 and the input section 11 are combined with each other.

The image reading section 2 includes a scanner and a document conveying section for conveying a document to the scanner, and reads characters and images printed on the document as image data. The image reading section 2 is designed to read an image with a predetermined resolution.

The image forming section 3 serves to print an image (text/photograph/graphics) corresponding input image data on a recording sheet such as a sheet of paper, and includes a photoreceptor drum, a charging device, an exposure device, a developing device, a transfer device, a fixing device, a paper tray, etc.

The second communication section 22 is an interface for communicating with an external apparatus such as the information processing apparatus 51. In the present embodiment, as described above, the second communication section 22 communicates with the information processing apparatus 51 with use of HTTP. Further, when an address to be accessed is the IP address of the multifunction printer 21, the second communication section 22 can access the second web server section 8 in the multifunction printer 21.

The web browser section 5 operates in accordance with software for a generally used web browser. The web browser section 5 can communicate, via the second communication section 22, not only with the first web server section 53 of the information processing apparatus 51 but also with the second web server section 8 in the multifunction printer 21.

In the present embodiment, when data indicative of an operation window or print data is requested and when a control command for controlling functions (such as scan function and print function) of the multifunction printer 21 is not executed, the web browser section 5 communicates with the first web server section 53 of the information processing apparatus 51. On the other hand, when the control command for controlling functions of the multifunction printer 21 is executed, the web browser section 5 communicates with the second web server section 8 in the multifunction printer 21. Specific examples will be explained later.

The second web server section 8 operates in accordance with software of a generally used web server. The second web server section 8 receives a request (HTTP request) from the web browser section 5, causes an application corresponding to the request to be executed, and sends a response (HTTP response) to the web browser section 5.

The control application section 23 executes a process in accordance with a web application running on the web server. An example of the web application is a custom application described in Java® script, and runs in a Java® runtime environment provided on the web server.

When it is necessary to control functions (such as scan function and print function) of the multifunction printer 21, the control application section 23 transmits a control command for controlling such a function to the device control section 7. Alternatively, the control application section 23 controls the web browser section 5 in accordance with a control command so that information unique to the multifunction printer 21 is transmitted to the first web server section 53. This allows controlling a function of the multifunction printer 21.

The device control section 7 serves to control the various functions of the multifunction printer 21. Specifically, the device control section 7 controls the operation of the image reading section 2, the image forming section 3, the second communication section 22, the operation section 4, etc.

For example, the device control section 7 controls the operation of the image reading section 2 to obtain data on a scanned image. Further, the device control section 7 controls the operation of the image forming section 3 to form on a sheet of paper an image indicated by input image data and output the image. Furthermore, the device control section 7 uses the second communication section 22 to store input image data in a designated external resource or attach input image data to an e-mail and send the e-mail to a designated address.

The device control section 7 can operate in either a unique operation mode or a cooperative operation mode. The unique operation mode is a mode by which the device control section 7 causes the display section 10 to display an operation window unique to the multifunction printer 21 and stored in advance in the multifunction printer 21 and performs such control as described above in accordance with an instruction entered into the operation window from the input section 11. The cooperative operation mode is a mode by which the device control section 7 causes the display section 10 to display an operation window received from the information processing apparatus 51 and performs such control as described above in accordance with a control instruction received from a control application based on an instruction entered into the operation window. The unique operation mode is a general mode in which a conventional multifunction printer operates, and as such, is not described in detail here.

In response to an instruction to operate in the cooperative operation mode, the device control section 7 activates the web browser section 5 and causes the web browser section 5 to execute a process based on a preset URL (which, in the present embodiment, requests the first web server section 53 of the information processing apparatus 51 to send an initial operation window). Moreover, in the cooperative operation mode, the device control section 7 receives a control command from the control application section 23 and performs control based on the control command.

The device control section 7 includes an Open I/F section 71 capable of receiving a control command regardless of the model of the multifunction printer 21. The Open I/F section 71 publishes a control command for controlling functions of the multifunction printer 21 to the control application section 23. The Open I/F section 71 receives a control command from the control application section 23 and converts the received control command to a command recognizable by the device control section 7.

The Open I/F section 71 includes a conversion table storage section (not shown) for storing a conversion table in which a control command published to the outside is related to a command recognizable by the device control section 7. The Open I/F section 71 converts a command based on the conversion table.

As described above, the Open I/F section 71 can receive a control command common among different models of the multifunction printer 21. Therefore, a web application for operating the control application section 23 may be common among different models of the multifunction printer 21. Consequently, when the control application section 23 is operated in accordance with a new web application, it is only required to install the same application to individual multifunction printers 21, so that it is unnecessary to change a web application with respect to each of individual multifunction printers 21. This enables development of a web application for operating the control application section 23 to be easier.

[Process Flow of Cooperative Operation Mode]

Figure 2:
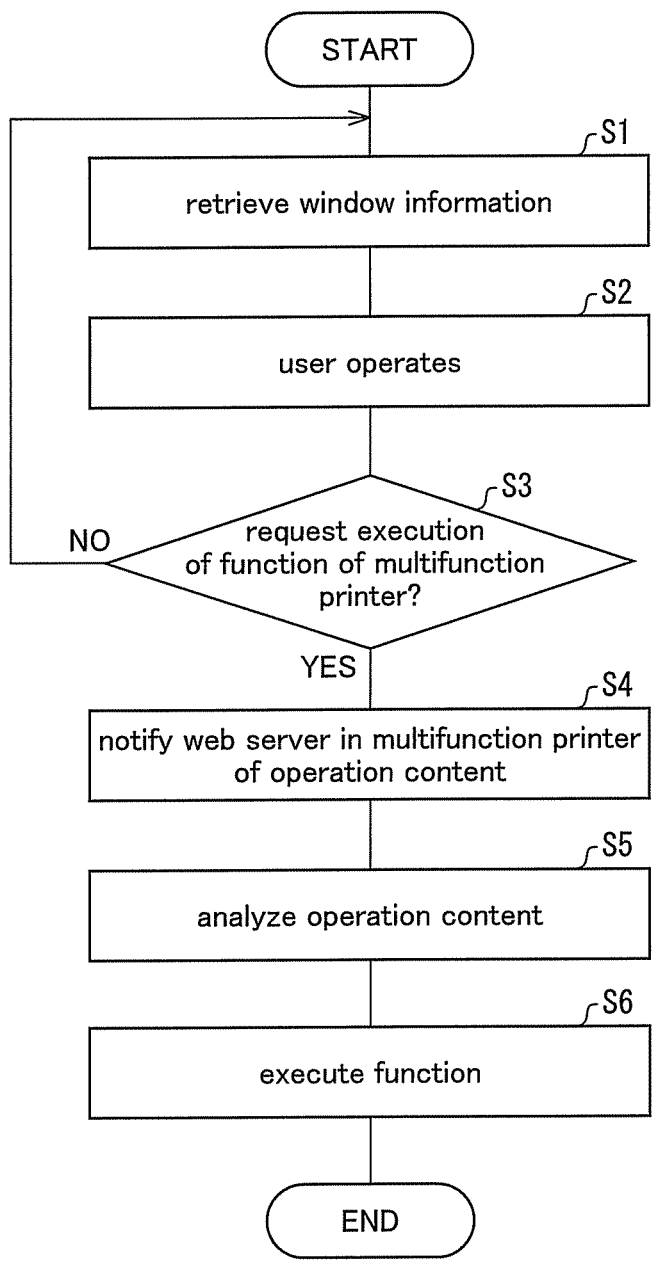
FIG. 2 is a flowchart showing a flow of a process of a cooperative operation mode in which a multifunction printer and an information processing apparatus carry out a process in such a manner that the multifunction printer and the information processing apparatus operate in combination with each other.

With reference to FIG. 2, the following explains a flow of a process of the cooperative operation mode in which the multifunction printer 21 and the information processing apparatus 51 carry out a process in cooperation with each other. FIG. 2 is a flowchart showing the flow of the process of the cooperative operation mode.

Initially, when an instruction to start the cooperative operation mode is entered into the input section 11, the device control section 7 starts the web browser section 5 so that the web browser section 5 accesses a preset URL. A URL for requesting the first web server section 53 of the information processing apparatus 51 to transmit an initial operation window is set in advance. Therefore, the web browser section 5 transmits, to the information processing apparatus 51 via the second communication section 22, an HTTP Get command for requesting the information processing apparatus 51 to transmit an initial operation window. The first web server section 53 of the information processing apparatus 51 transmits, to the multifunction printer 21, HTML data corresponding to an operation window corresponding to the HTTP Get command. The web browser section 5 of the multifunction printer 21 causes the display section 10 to display a window indicated by the HTML data thus received (S1).

Next, the input section 11 of the multifunction printer receives an instruction entered by a user into the displayed operation window (S2).

After that, if the input from the user is an instruction that requests a next operation window and is not an instruction to control the various functions of the multifunction printer 21 (No in S3), Steps S1 and S2 are repeated.

On the other hand, if the input from the user is an instruction to control the various functions of the multifunction printer 21 (Yes in S3), the second web server section 8 is informed so (S4). In the present embodiment, an HTTP response to be sent from the information processing apparatus 51 to the multifunction printer 21 is designed such that if the input from the user is an instruction to control the various functions of the multifunction printer 21, the second web server section 8 of the multifunction printer 21 is informed so.

Specifically, the external application section 54 of the information processing apparatus 51 has set as the loop-back address an address to be accessed when a button to give an instruction to control the various functions of the multifunction printer 21 is pressed in the HTML data on the operation window to be sent to the multifunction printer 21. Accordingly, when the button to give an instruction to control the various functions is pressed in the operation window, the web browser section 5 of the multifunction printer 21 can access the second web server section 8 in the multifunction printer 21 in accordance with the loop-back address to notify the second web server section 8 of the instruction to control the various functions.

Alternatively, the external application section 54 of the information processing apparatus 51 may be designed such that an address to be accessed when a button to give an instruction to control the various functions of the multifunction printer 21 is pressed on the operation window to be sent to the multifunction printer 21 is that of the first web server section 53 of the information processing apparatus 51. In this case, when the external application section 54 receives an HTTP request indicating that a button to give an instruction to control the various functions is pressed on the operation window is pressed, the external application section 54 transmits, to the multifunction printer 21, an HTTP response for changing an address to be accessed to that of the second web server section 8 of the multifunction printer 21 with use of HTTP redirect. Thus, the web browser section 5 of the multifunction printer 21 can access the second web server section 8 of the multifunction printer 21 in accordance with the HTTP response and notify the second web server section 8 of the instruction to control the various functions.

After that, the control application section 23 started by the second web server section 8 analyzes the content of the control instruction sent from the web browser section 5 (S5).

Then, the control application section 23 generates, in accordance with a result of the analysis, a control command to control the functions of the multifunction printer 21, and then sends the control command to the Open I/F section 71. Upon receiving the control command, the Open I/F section 71 converts the control command into a command that can be recognized by the device control section 7. After that, the device control section 7 controls the various functions in accordance with the command thus converted (S6).

As described above, the multifunction printer control system of the present embodiment includes: the information processing apparatus 51 including the first web server section 53 which operates in accordance with software for the web server; and the multifunction printer 21 with which the information processing apparatus 51 communicates via the communications network 50.

The multifunction printer 21 includes: the web browser section 5 that operates in accordance with software for a web browser; and the second web server section 8 that operates in accordance with software for a web server. The web browser section 5 receives, from the first web server section 53, control information for notifying the second web server section 8 of a control command to control the multifunction printer 21. Upon reception of the control information from the first web server section 53, the web browser section 5 carries out a notification process of notifying the second web server section 8 of the control command. Further, the multifunction printer 21 includes: the control application section 23 and the device control section 7 each for controlling functions of the multifunction printer 21 in accordance with a control instruction of which the web browser section 5 notifies the second web server section 8.

For example, the web browser section 5 causes the display section 10 to display an operation window indicated by window data retrieved from the first web server section 53, and notifies the second web server section 8 of an instruction to control a function of the multifunction printer 21, which instruction is entered into the operation window.

Alternatively, the web browser section 5 may receive from the first web server section 53 control information (control content) described in Java® script and notifies the second web server section 8 of a control command in the control information.

Consequently, it is only required for the control application section 23 and the device control section 7 to receive a control command from the second web server section 8 in the multifunction printer 21. It is unnecessary for the control application section 23 and the device control section 7 to receive a control command from the first web server section 53 of the information processing apparatus 51. Since all of the control application section 23, the device control section 7, and the second web server section 8 are included in the multifunction printer 21, a firewall is not constructed among the control application section 23, the device control section 7, and the second web server section 8. Consequently, even if a firewall is constructed in the communications network 50 between the multifunction printer 21 and the information processing apparatus 51, it is possible for the information processing apparatus 51 to control functions of the multifunction printer 21. Further, since window data indicative of an operation window is included in the information processing apparatus 51, editing the window data included in the information processing apparatus 51 allows easily changing an operation window displayed by the multifunction printer 21.

The following explains specific process examples of the cooperative operation mode in the multifunction printer control system of the present embodiment.

Specific Example 1

Scan Application (in Case of Using Loop-Back Address)

Figure 3:
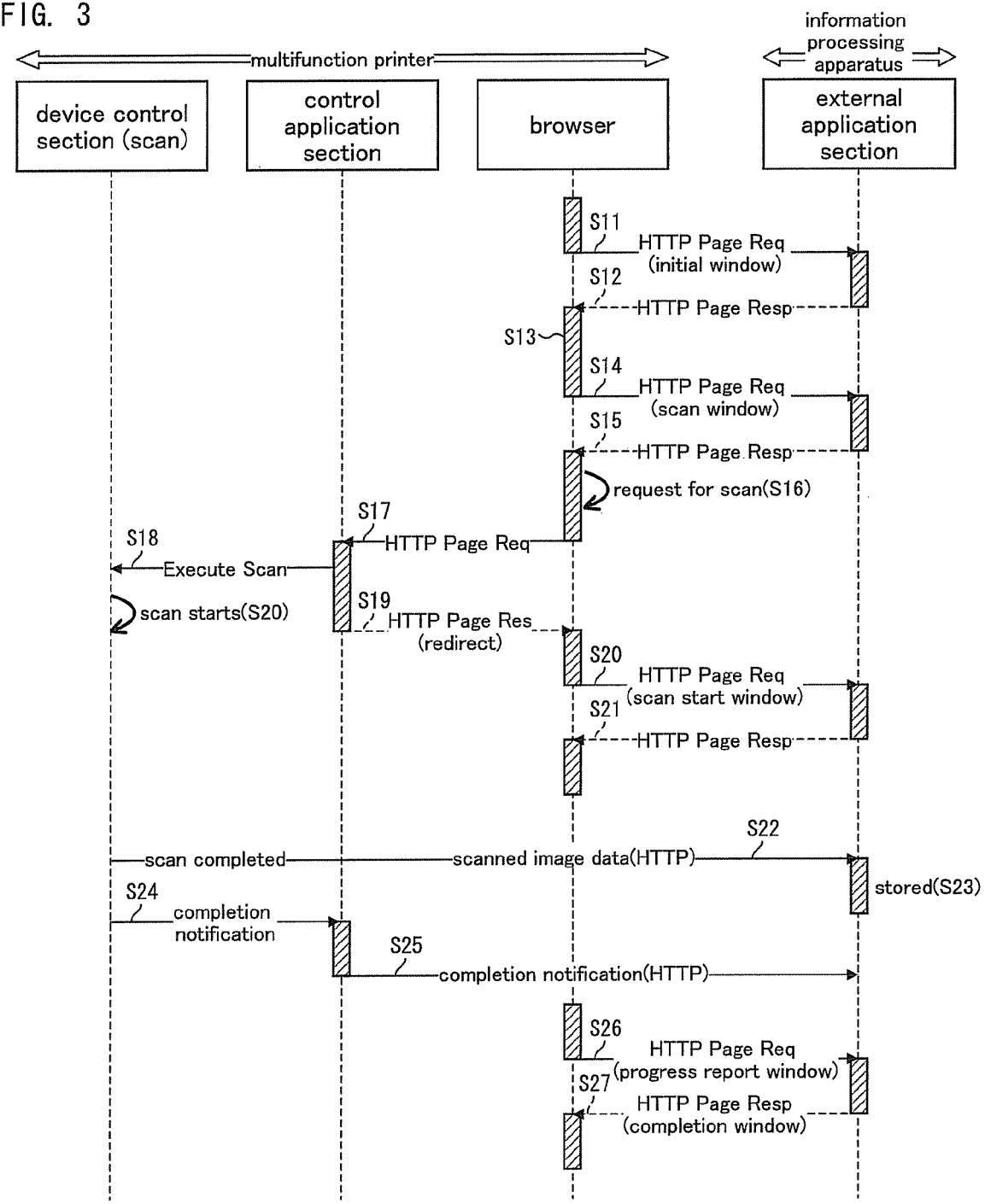
FIG. 3 is a drawing showing a specific example of the cooperative operation mode when the multifunction printer carries out scanning.

Initially, an explanation is made as to a flow of a process of a specific example in which the multifunction printer 21 and the information processing apparatus 51 cooperate with each other, the multifunction printer 21 displays an operation window, and the multifunction printer 21 carries out scanning. FIG. 3 is a drawing showing a flow of a process of the present specific example.

When an instruction to start the cooperative operation mode is entered into the input section 11, the device control section 7 starts the web browser section 5. The web browser section 5 accesses the information processing apparatus 51 in accordance with a preset initial URL, and sends an HTTP Get command for requesting an initial operation window for managing documents (S11).

When the external application section 54 receives the HTTP Get command sent in S11, the external application section 54 sends back, to the multifunction printer 21, HTML data corresponding to an initial operation window for managing documents which corresponds to the HTTP Get command (S12). The web browser section of the multifunction printer 21 causes the display section 10 to display the operation window based on the HTML data (S13).

FIG. 4 is a drawing showing an example of HTML data in which definition of an operation window is described. FIG. 5 is a drawing showing an example of an operation window based on the HTML data shown in FIG. 4. As shown in FIGS. 4 and 5, the operation window for prompting a user to enter a login name and a password is displayed.

When a login name and a password are entered in the operation window and a "login" button is pressed, the web browser section 5 carries out a next process in accordance with the HTML data received in S12. For example, when the web browser section 5 has received the HTML data shown in FIG. 4, the web browser section 5 sends input authentication information (login name and password in this example) to URL: http://123.123.123.123/app/auth which is designated by action attribute in an authentication form factor. Note that 123.123.123.123 is an IP address of the information processing apparatus 51 and app/auth indicates an authentication application running on the external application section 54. In this case, the web browser section 5 sends, to the information processing apparatus 51 via the second communication section 22, the authentication information and an HTTP request for an operation window of a scan function (S14).

On the other hand, the first web server section 53 of the information processing apparatus 51 instructs the external application section 54 to carry out an authentication application process in accordance with the HTTP request sent in S14. Then, the external application section 54 carries out an authentication process on the authentication information received from the multifunction printer 21 in accordance with the authentication application.

Specifically, the external application section 54 checks whether the authentication information matches the prestored user name and the prestored password, and if the authentication information matches, the external application section 54 determines that authentication has been completed successfully and if the authentication information does not match, the external application section 54 determines that authentication has ended up in failure. Then, when authentication has been completed successfully, the external application section 54 generates HTML data indicative of an operation window for carrying out a scan function. On the other hand, when authentication has ended up in failure, the external application section 54 generates HTML data indicative of an operation window for prompting a user to enter authentication information again. The first web server section 53 sends the HTML data generated by the external application section 54 as an HTTP response to the multifunction printer 21 (S15).

Thereafter, in the multifunction printer 21 having received the HTML data, the web browser section causes the display section 10 to display an operation window corresponding to the HTML data. In FIG. 3, it is supposed that authentication has been completed successfully and the operation window for carrying out a scan function (scan start operation window) is displayed.

FIG. 6 is a drawing showing an example of data indicative of HTML-format definition of the operation window for carrying out a scan function (scan start operation window). FIG. 7 is a drawing showing an example of an operation window based on the HTML data shown in FIG. 6. As shown in FIGS. 6 and 7, an operation window including a button for carrying out a scan function is displayed.

In the present specific example, as shown in FIG. 6, when the button for carrying out a scan function is pressed, http://127.0.0.1/scan/execscan is set as a next URL. This is a characteristic which is not seen in the prior art. IP address "127.0.0.1" is a loop-back address. "scan/execscan" in the URL indicates an instruction to carry out a scan function with use of a scan application.

The operation window may include a button for selecting a scan condition. In this case, a URL to which the scan condition is added as a query string is set in the HTML data. For example, a scan condition that scanning is carried out in a monochrome mode and scanned image data is output in a PDF file is added as a query string to the URL as follows: http://127.0.0.1/scan/execscan?color=mono&file=pdf. Here, the string after "?" indicates a query string, "color=mono" indicates that color setting is monochrome, and "file=pdf" indicates that scanned image data is output in a PDF file. Thus, it is possible to designate the scan condition, too.

Consequently, when the "scan" button is pressed in FIG. 7 (S16), the web browser section 5 accesses the second web server section 8 in the multifunction printer 21 including the web browser section 5 since the IP address in the URL is a loop-back address. The web browser section 5 sends, to the second web server section 8, an HTTP request including an instruction to carry out a scan function with use of the scan application (S17).

The second web server section 8 causes the control application section 23 to carry out a scan application process in accordance with the HTTP request from the web browser section 5. The control application section 23 generates a control command for scanning in accordance with the scan application and sends the control command to the device control section 7 (S18). When a scan condition is included in the HTTP request, the control application section 23 generates a control command for scanning under the scan condition.

Further, when the control application section 23 sends the control command to the device control section 7, the control application section 23 is required to send back a response corresponding to the HTTP request from the web browser section 5. When sending back the response, the control application section 23 may send data of the operation window described in HTML as the response and the web browser section 5 causes the display section 10 to display a window based on the HTML data.

However, in this case, there are two candidates for the operation window to be displayed by the multifunction printer 21: one is an operation window based on data received from the external application section 54 of the information processing apparatus 51, and the other is an operation window based on data received from the control application section 23 in the multifunction printer 21. If the application running on the control application section 23 and the application running on the external application section 54 were made by different makers, it would be expected that there would be different forms of an operation window to be displayed to a user. This might put the user in an uncomfortable feeling. Alternatively, in order not to put the user in an uncomfortable feeling, it would be necessary for the maker of the application running on the control application section 23 and the maker of the application running on the external application section 54 to unify the form of the operation window in advance, which would make it difficult to develop the applications rapidly. Therefore, it is preferable that the operation window to be displayed by the display section 10 is wholly controlled by the external application section 54.

For the above reason, the control application section 23 sends, to the web browser section 5, an HTTP response for changing an address to be accessed to that of the first web server section 53 of the information processing apparatus 51 with use of HTTP redirect and requesting the information processing apparatus 51 to send a scan start window (control start window) (S19).

To be more specific, the control application section 23 transmits an HTTP response using HTTP redirect shown in FIG. 8 to the web browser section 5. It is known that when a response is made from a web server using HTTP redirect, it is only required to send HTML data to which an HTTP status code "301" or "302" is added and in which a changed URL is described in a location attribute (Location: http://123.123 . . . in the drawing).

The web browser section 5 receives the HTTP response shown in FIG. 8, analyses the HTTP response, and carries out a process in accordance with an URL designated by the location attribute. Since an IP address included in the URL designated by the location attribute is that of the information processing apparatus 51, the web browser section 5 sends, to the information processing apparatus 51, an HTTP request for requesting operation window data indicated by the URL (S20).

Then, the first web server section 53 of the information processing apparatus 51 sends, to the multifunction printer 21, a response which is HTML data indicative of an operation window requested by the HTTP request from the web browser section 5 (S21). Then, the web browser section 5 causes the display section 10 to display an operation window indicated by the HTML data.

FIG. 9 is a drawing showing an example of HTML data indicative of window definition, which is to be sent as a response to the request in S20. FIG. 10 is a drawing showing an example of an operation window based on the HTML data shown in FIG. 9. As shown in FIGS. 9 and 10, an operation window for indicating start of scanning is displayed.

The first web server section 53 sends, to the web browser section 5, not only the window definition shown in FIG. 9 but also an instruction to request a progress report window after a predetermined time. Consequently, when the predetermined time has passed, the web browser section 5 sends an HTTP request for requesting the progress report window to the information processing apparatus 51. Such an instruction to request a window after a predetermined time is a publicly known technique.

When the external application section 54 receives a request for the progress report window and when the external application section 54 has not yet received a completion notification from the control application section 23, the external application section 54 generates HTML data indicative of a window indicating that scanning is in progress. The first web server section 53 sends the HTML data to the web browser section 5, and the web browser section 5 causes the display section 10 to display the window indicating that scanning is in progress. When the first web server section 53 sends to the web browser section 5 the HTML data indicative of the window indicating that scanning is in progress, the first web server section 53 also sends an HTTP request for requesting a progress report window again after the predetermined time. Consequently, the web browser section 5 can repeatedly request the progress report window with respect to each predetermined time.

Thereafter, when the device control section 7 controls the image reading section 2 to complete scanning, the device control section 7 sends scanned image data to a designated block. Assume that the external application section 54 of the information processing apparatus 51 is designated. Accordingly, the device control section 7 controls the second communication section 22 so that the second communication section 22 sends the scanned image data to the external application section 54 of the information processing apparatus 51 (S22). The external application section 54 receives the image data and stores the image data in a storage section (S23).

Further, when scanning is completed, the device control section 7 notifies the control application section 23 of completion of scanning (S24). When the control application section 23 is notified of completion of scanning, the control application section 23 notifies the external application section 54 of completion of scanning (S25).

When the external application section 54 receives from the web browser section 5 the HTTP request for requesting the progress report window (S26), since the external application section 54 has been notified by the control application section 23 of completion of scanning, the external application section 54 generates HTML data indicative of an window indicating that scanning is completed, and sends the HTML data to the web browser section 5 via the first web server section 53 (S27). Consequently, the web browser section 5 can cause the display section 10 to display the completion window.

As described above, in the present specific example 1, the web browser section 5 sends an HTTP request for requesting an operation window to the first web server section 53, and receives, as a response to the HTTP request, an HTTP response including window data to which a loop-back address is set as an address to be accessed when an instruction to scan is entered into the operation window. Then, when the instruction to scan is entered into the operation window, the web browser section 5 can access the second web server section 8 in accordance with the HTTP response and notify the second web server section 8 of the input instruction to scan. Thus, it is possible to make the multifunction printer 21 scan.

Specific example 2

Scan Application (in Case of Using HTTP Redirect)

In the above specific example 1, the external application section 54 of the information processing apparatus 51 sends HTML data including a loop-back address, and the web browser section 5 accesses the second web server section 8 in the multifunction printer 21 with use of the loop-back address. Alternatively, the present invention may be arranged such that the external application section 54 uses HTTP redirect instead of a loop-back address so that the web browser section 5 accesses the second web server section 8 in the multifunction printer 21. The specific example 2 is an example in which scanning is carried out with use of HTTP redirect.

Figure 11:
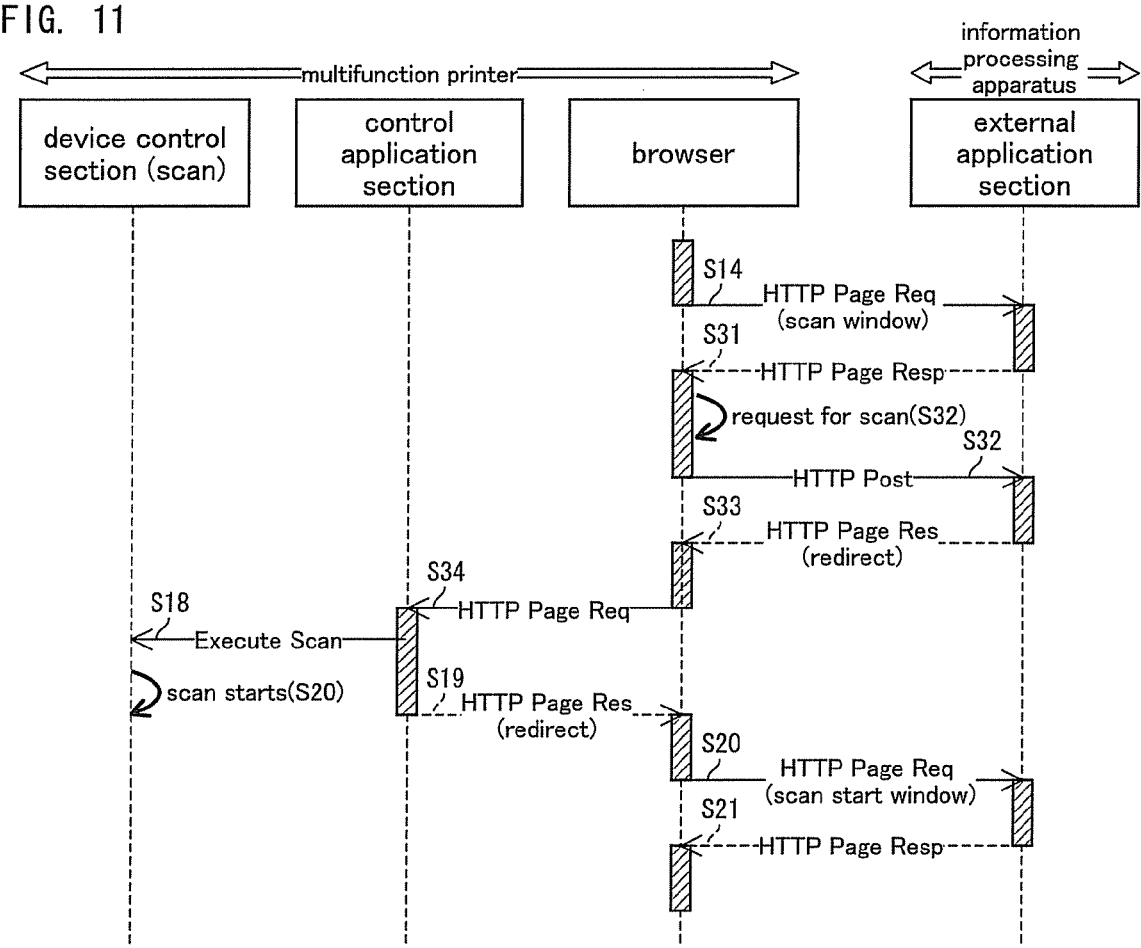
FIG. 11 is a drawing showing another specific example of the cooperative operation mode when the multifunction printer carries out scanning.

FIG. 11 is a drawing showing a flow of a process of the present specific example. Also the present specific example carries out S11-S13 and S22-S27 shown in FIG. 3. Since these steps are the same as those in the specific example 1, these steps are omitted in FIG. 11.

As in the specific example 1, when the web browser section 5 sends input authentication information to the information processing apparatus 51 (S14), the first web server section 53 of the information processing apparatus 51 instructs the external application section 54 to carry out an authentication application process based on the authentication information. If the authentication is completed successfully, the external application section 54 sends, to the multifunction printer 21, an HTTP response which is HTML data indicative, of an operation window for carrying a scanning function (S31).

In this case, the external application section 54 designs HTML data in advance to include URL indicating that when a button for indicating execution of a scan function is pressed, data indicating entry of a scan execution instruction is sent to the first web server section 53.

Therefore, when the multifunction printer 21 displays an operation window for carrying out a scan function (e.g. FIG. 7) and an instruction to execute a scan function is entered into the input section 11, the web browser section 5 sends, to the information processing apparatus 51, an HTTP POST command indicating that the scan execution instruction is entered in accordance with URL included in the HTML data sent in S31 (S32).

When the information processing apparatus 51 receives the HTTP POST command indicating that the scan execution instruction is entered, the external application section 54 of the information processing apparatus 51 sends to the multifunction printer 21 an HTTP response for changing an address to be accessed to that of the second web server section 8 in the multifunction printer 21 and for instructing the multifunction printer 21 to carry out scanning (S33). The HTTP response is designed such that a loop-back address is designated as the changed address to be accessed.

Consequently, when the web browser section 5 receives the HTTP response sent in S33, the web browser section 5 can recognize that an address to be accessed is a loop-back address, access the second web server section 8, and notify the second web server section 8 of an instruction to carry out scanning (S34).

When the control application section 23 recognizes that the instruction forwarded from the web browser section 5 is an instruction to carry out scanning, the control application section 23 generates a control command for carrying out scanning, and sends the control command to the device control section 7. Steps on and after S18 are the same as those in the specific example 1 and therefore explanations of the steps are omitted here.

The operation window sent in S31 may include an input section to which a scanning condition is set. In this case, in S32, data indicating pressing of a button for carrying out scanning as well as the input scanning condition are sent to the information processing apparatus 51. The scanning condition here indicates a monochrome/color mode, the form of an output file (e.g. PDF, TIFF) etc. In S33, the external application section 54 sends an HTTP response including a URL which includes an instruction to carry out scanning according to the scanning condition and which is used for changing an address to be accessed to that of a component in the multifunction printer 21. For example, a URL: http://127.0.0.1/scan/execscan?color=mono&file=pdf is set. Here, color=mono indicates that color setting is monochrome and file=pdf indicates that scanned image data is output in the form of PDF. Such URL allows designating the scanning condition, too.

As described above, in the present specific example 2, when the scanning execution instruction is entered into the operation window, the web browser section 5 sends to the first web server section 53 an HTTP request indicating that the scanning execution instruction is entered. The web browser section 5 receives, from the first web server section 53, a response to the HTTP request, which is a first HTTP response including (i) an instruction to change an address to be accessed to that of the second web server section 8 with use of HTP redirection and (ii) the scanning execution instruction. Consequently, the web browser section 5 can access the second web server section 8 in accordance with the received first HTTP response and notify the second web server section 8 of the scanning execution instruction. Consequently, it is possible to cause the multifunction printer 21 to execute scanning.

Specific Example 3

Modification Example of Scan Application (in Case of Using HTTP Redirect)

This specific example is a modification of Specific Example 2 described above. Multifunction printers vary in performance from model to model. Therefore, in Specific Examples 1 and 2, in order for the multifunction printer to display an operation window depending on its model, the external application section 54 needs to have stored therein HTML data on an operation window corresponding to the model of the multifunction printer 21. And the web browser section 5 needs to send an HTTP Get command for requesting an initial operation window for managing documents, which corresponds to the model of multifunction printer 21 in which the web browser section 5 is provided. In this case, creating an external application requires creating a program corresponding to an operation window for the model of each multifunction printer, but this requires a great deal of effort and time. This specific example is an example where it is not necessary to consider the model of multifunction printer in creating an external application.

In the present specific example, the control application section 23 in the multifunction printer 21 receives, from the external application section 54, a transmission command (control command) to transmit unique information indicative of the performance of the multifunction printer 21 (e.g. list of parameter for resolution of image reading section). When the control application section 23 receives the transmission command to transmit the unique information, the control application section 23 transmits the unique information to the external application section 54 via the web browser section 5. The external application section 54 generates HTML data indicative of an operation window based on the unique information received from the web browser section 5 in the multifunction printer 21. Consequently, it is possible to generate an external application regardless of the model of a multifunction printer. The following explains a specific example in which the unique information is used for the scan application shown in the specific example 2.

Figure 12:
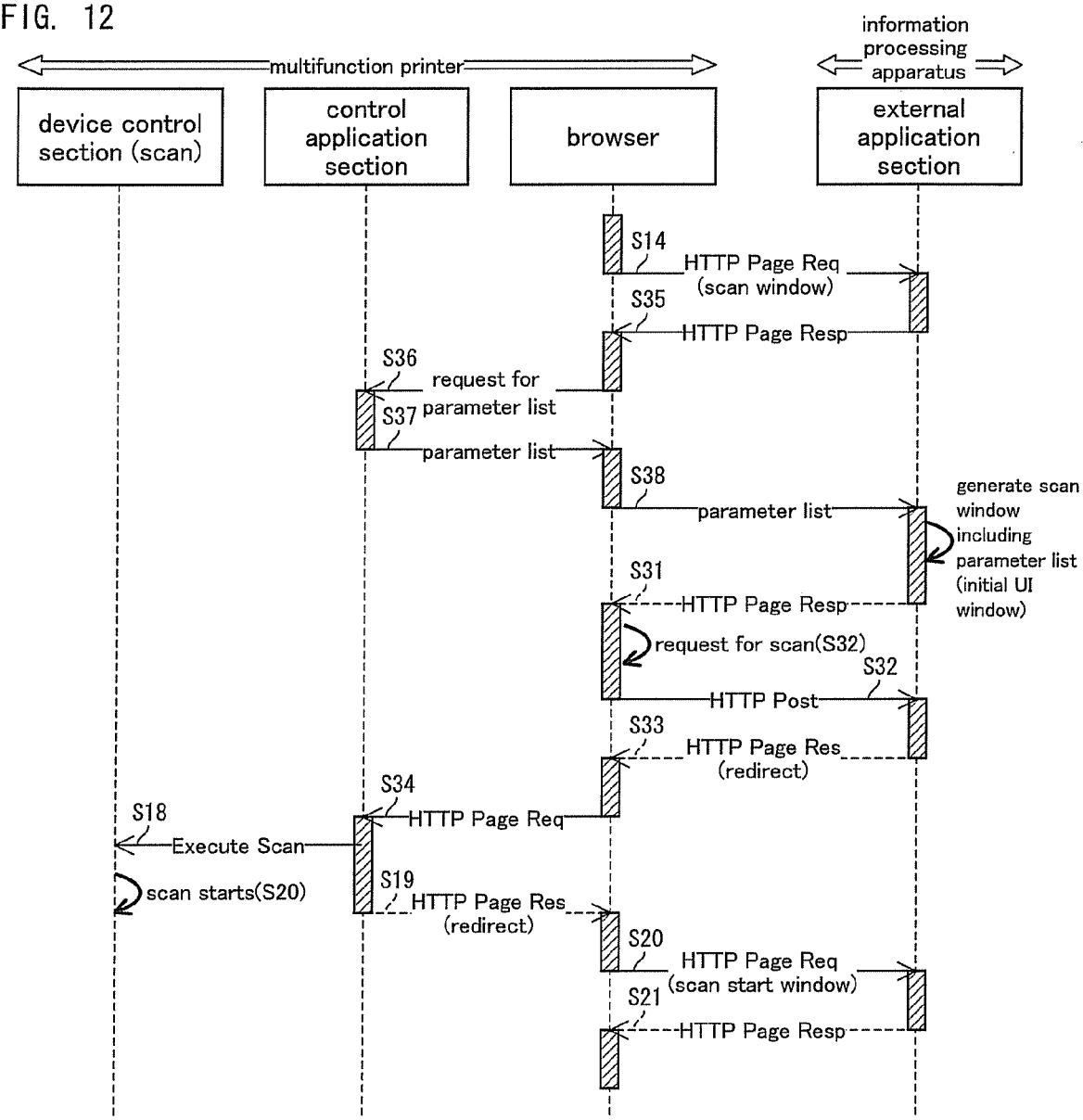
FIG. 12 is a drawing showing a modification example of the example shown in FIG. 11.
Figure 13:
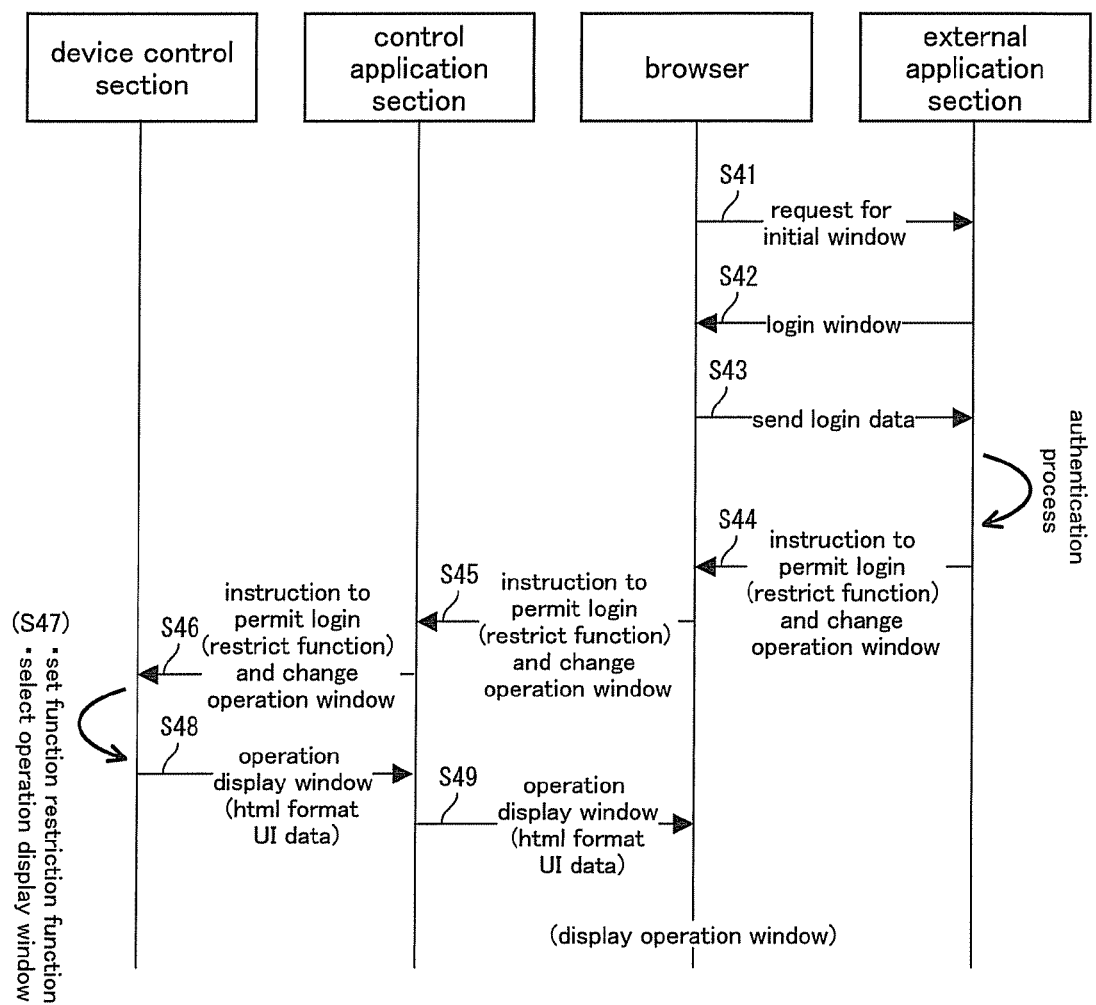
FIG. 13 is a drawing showing a specific example of the cooperative operation mode when a function of the multifunction printer is restricted.

FIG. 12 is a drawing showing a flow of a process of the present specific example. The step of S14 and the steps on and after S32 are the same as those in FIG. 11 and therefore explanations thereof are omitted here.

The first web server section 53 of the information processing apparatus 51 instructs the external application section 54 to generate an operation window in accordance with the HTTP request for a scan function operation window, which HTTP request is sent in S14.

The external application section 54 sends, to the web browser section 5 via the first web server section 53, an HTTP response to the HTTP request in S14 (S35). The HTTP response is a response in which a transmission command which designates the second web server section 8 as an access destination, starts the control application section 23, and transmits unique information (here, list of parameter indicative of degree of reading resolution) to the first web server section 53 is described in Java® script (HTML format control content (control information)).

The Java® script command embedded in the HTML response can be executed on a generally used web browser alone. Therefore, the web browser section 5 executes the transmission command. Specifically, the web browser section 5 transmits the transmission command to the second web server section 8. The second web server section 8 starts the control application section 23 in accordance with the transmission command (S36). Thereafter, the control application section 23 reads out a parameter list stored in advance. Then, the control application section 23 controls the web browser section 5 so that an HTTP request including the parameter list is sent to the first web server section 53 (S37, S38).

Consequently, the external application section 54 can generate an operation window including the parameter list which the first web server section 53 has received. For example, the external application section 54 can generate an operation window for selecting one of a plurality of degrees of reading resolution which are included in the parameter list. The external application section 54 sends an HTTP response including the generated operation window to the web browser section 5 via the first web server section 53 (S31). Consequently, the web browser section 5 can cause the display section 10 to display an operation window corresponding to the model of the multifunction printer 21.

The control application section 23 may store unique information (parameter list indicative of degrees of reading resolution in the present specific example) in advance. Alternatively, the present invention may be arranged such that the Open I/F section 71 stores the parameter list and the control application section 23 refers to the Open I/F section 71 for the parameter list and obtains the parameter list from the Open I/F section 71.

As described above, in the present specific example 3, the web browser section 5 receives, from the first web server section 53, control information for notifying the second web server section 8 of a transmission command of unique information indicative of the performance of the multifunction printer 21. Since the transmission command is described in Java® script, the web browser section 5 can execute the transmission command. Specifically, the web browser section 5 notifies the second web server section 8 of the transmission command. The control application section 23 controls the web browser section 5 so that the web browser section 5 transmits the unique information (parameter list indicative of degrees of reading resolution) to the first web server section 53 in accordance with the transmission command. Thereafter, the web browser section 5 receives from the first web server section 53 HTML data of an operation window generated based on the unique information, and causes the display section 10 to display the operation window.

As described above, by designing the control application section 23 to store unique information such as degrees of reading resolution or to be capable of obtaining the unique information, an external application for generating an operation window can be designed to be versatile regardless of the model of the multifunction printer 21. Further, since the external application section 54 generates an operation window based on the unique information, it is possible to cause the multifunction printer to easily display an operation window corresponding to the model of the multifunction printer.

Specific Example 4

Authentication Application

This specific example serves to restrict the various functions of the multifunction printer 21 in accordance with a result of an authentication process by authentication information. Possible cases of restriction of the various functions of the multifunction printer 21 are, for example, a case where color copying is prohibited and only monochrome copying is allowed to be executed, a case where the number of copies is restricted to a predetermined number (e.g., 100), etc.

The external application section 54 has stored in advance therein a restriction table that associates each user name with restriction information indicative of restriction of the various functions of the multifunction printer 21. For example, the external application section 54 has stored therein a restriction table that associates a user name "AAA" with restriction information indicative of prohibition of color copying and a user name "BBB" with restriction information indicating that an upper limit on the number of copies is 100.

When having succeeded in authentication, the external application section 54 reads out restriction information corresponding to the user name from the restriction table. Then, the external application section 54 sends to the web browser section 5 an HTTP response for changing an address to be accessed to that of the second web server section 8 in the multifunction printer 21 with use of the function of HTTP redirect and for executing restriction indicated by the restriction information thus read out. The following describes the flow of a process in this specific example with reference to FIG. 13.

Initially, when an instruction to start the cooperative operation mode is entered into the input section 11, the device control section 7 starts the web browser section 5. The web browser section 5 transmits an HTTP Get command for initial operation window data to the information processing apparatus 51 (S41).

When the external application section 54 has received the Get command, the external application section 54 sends back, to the multifunction printer 21, HTML data indicative of an initial operation window corresponding to the Get command (S42). The web browser section 5 of the multifunction printer 21 causes the display section 10 to display the initial operation window (e.g. window shown in FIG. 5) indicated by the HTML data.

When a user name and a password are entered into the window and a "login" button is pressed, the web browser section 5 sends the authentication information thus entered (which is here the user name and the password) to the information processing apparatus 51 in accordance with a URL described in the HTML data sent in S42 (S43). The steps of S41 and 42 are similar to those of S11 and S12 shown in FIG. 3.

Upon receiving the authentication information, the external application section 54 checks whether the authentication information matches the prestored user name and the prestored password and performs an authentication process for, if it does, determining that authentication has been completed successfully or for, if it does not, determining that authentication has ended up in failure. Then, when authentication has been completed successfully, the external application section 54 reads out, from the prestored restriction table, restriction information corresponding to the user name indicated by the authentication information.

Next, the external application section 54 sends to the multifunction printer 21 an HTTP response for changing an address to be accessed to that of the second web server section 8 in the multifunction printer 21 with use of the function of HTTP redirect and for giving an instruction to restrict functions in accordance with restriction information read from the restriction table and which gives an instruction to change an operation window corresponding to the restriction information (S44). In the HTTP response, a loop-back address may be designated as the changed address to be accessed.

When receiving the HTTP response sent in S44, the web browser section 5 recognizes that the response uses HTTP redirect, and consequently the web browser section 5 accesses the second web server section 8 which is indicated as an access destination in the HTTP response, without causing the display section 10 to display a window. Further, the web browser section 5 sends, to the second web server section 8, an HTTP request which gives an instruction to restrict functions in accordance with restriction information and which gives an instruction to change an operation window corresponding to the restriction information (S45).

Receiving the HTTP request, the second web server section 8 starts the control application section 23 so that the control application section 23 carries out a process in accordance with the HTTP request. Specifically, the control application section 23 generates a control command which gives an instruction to restrict functions in accordance with the restriction information forwarded from the web browser section 5 and which gives an instruction to change the operation window in accordance with the restriction information, and the control application section 23 sends the control command to the device control section 7 (S46).

The device control section 7 sets function restriction based on the control command (S47). Furthermore, the device control section 7 has stored in advance therein a window table that associates each piece of restriction information with a piece of HTML-format image data indicative of an operation window corresponding to that piece of restriction information. Then, the device control section 7 reads out, from the window table, window data corresponding to the restriction information indicated by the control command, and then sends the window data to the control application section 23 (S48).

For example, when the control command indicates prohibition of color copying, the device control section 7, in S47, does not receive an instruction to execute color copying. Alternatively, the device control section 7 controls the image reading section 2 and the image forming section 3 so that monochrome copying is executed when an instruction to execute color copying is received in S47. Furthermore, in S48, the device control section 7 reads out, from the window table, HTML-format window data indicative of an operation window that can receive only an instruction to execute monochrome copying, and then sends the window data to the control application section 23.

Alternatively, when the control command indicates that an upper limit on the number of copies is 100, the device control section 7, in S47, counts the number of sheets of paper printed in the image forming section 3 and, when the number reaches 100, controls the image forming section 3 so that no further print process is executed. Furthermore, in S48, the device control section 7 reads out, from the window table, HTML-format window data indicative of an operation window containing a message indicating that an upper limit on the number of copies is 100, and then sends the window data to the control application section 23.

Then, the control application section 23 sends, to the web browser section 5, the window data received from the device control section 7 as an HTTP response to the HTTP request of S45 (S49). Consequently, the web browser section 5 causes the display section 10 to display an operation window indicated by the window data.

As described above, in the present specific example 4, the web browser section 5 causes the display section 10 to display an authentication information entry window for prompting a user to enter authentication information. When the authentication information is entered into the authentication information entry window, the web browser section 5 considers that an instruction to restrict a function of the multifunction printer 21 which function corresponds to a user indicated by the authentication information is entered as a control instruction, and sends an HTTP request including the authentication information and the restriction instruction to the first web server section 53. Thereafter, the web browser section 5 receives, from the first web server section 53, as a response to the HTTP request, an HTTP response including an instruction to change an address to be accessed to that of the second web server section 8 with use of HTTP redirect and an instruction to restrict a function of the multifunction printer 21 which function corresponds to a user indicated by the authentication information. Therefore, the web browser section 5 can notify the second web server section 8 of the restriction instruction by accessing the second web server section 8 in accordance with the HTTP response thus received. Consequently, the device control section 7 can restrict the function of the multifunction printer 21 in accordance with the restriction instruction of which the web browser section 5 notifies the second web server section 8.

Specific Example 5

Authentication Print Application

This specific example is an example where the information processing apparatus 51 has stored in advance therein print data to be printed and a user operates the multifunction printer 21 to execute a process for printing the print data. Executability of such a process makes it possible to, simply by storing print data to be printed in advance in the information processing apparatus 51, operate a multifunction printer 21 installed in a meeting room and thereby obtain printed matter on the spot, for example, in the case of urgent need of the printed matter during a meeting.

Figure 14:
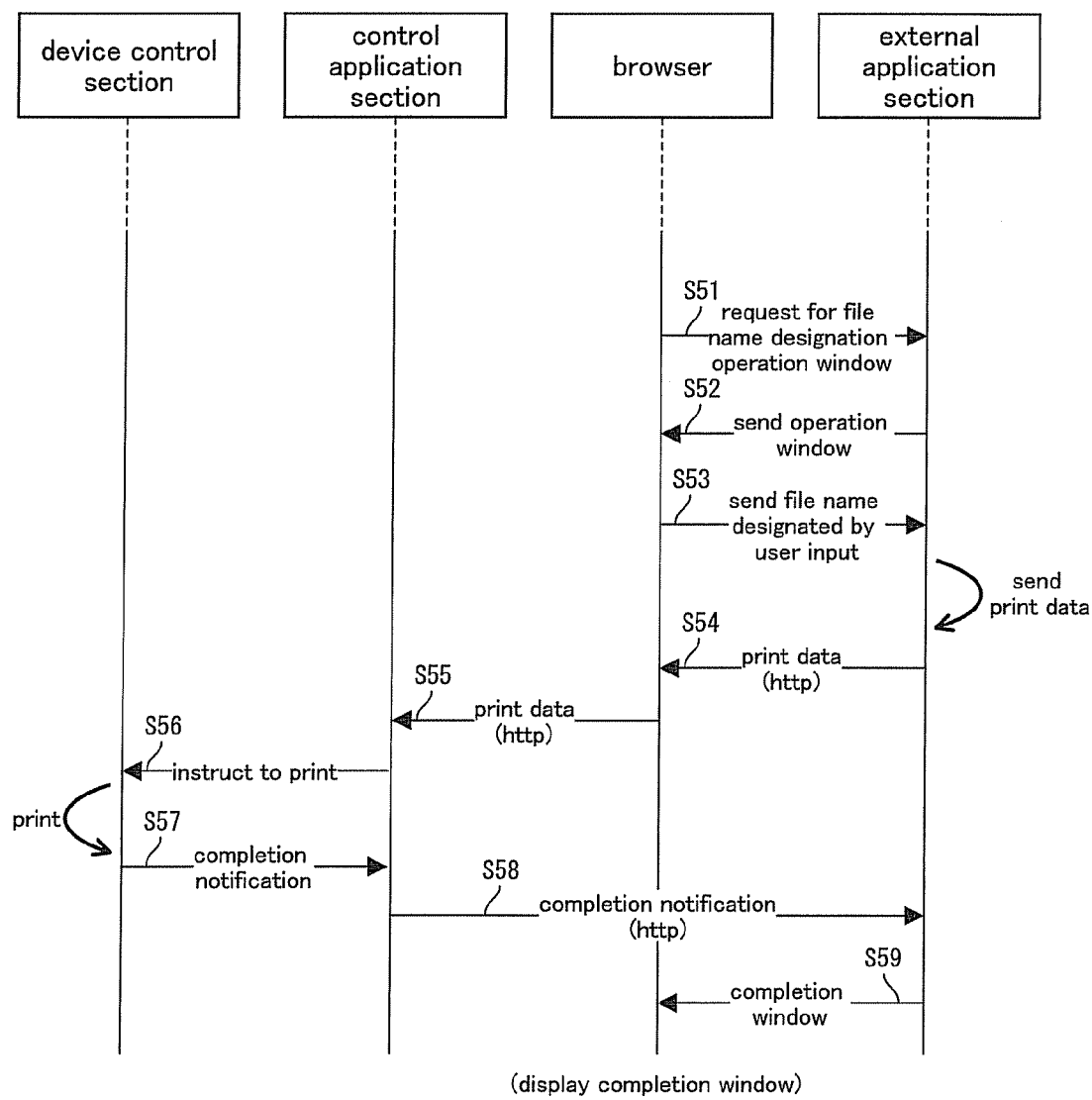
FIG. 14 is a drawing showing a specific example of the cooperative operation mode when the multifunction printer carries out printing.

The following describes the flow of a process in this specific example with reference to FIG. 14. It should be noted that prior to this specific example process, the user stores print data in advance in a storage section of the information processing apparatus 51. The process of the present specific example may be carried out after the processes of S11-S12 shown in FIG. 3 or after the processes of S41-S49 shown in FIG. 13. The explanations of S11-S12 and S41-S49 are omitted here.

Initially, in an operation window (image data selection window) received in the process of S12 or in the process of S51, a user enters an instruction to request an operation window for designating print data to be printed. Then, in response to this input, the web browser section 5 sends to the information processing apparatus 51 an HTTP Get command that requests an operation window (image data selection window) for designating print data (S51).

When the first web server section 53 of the information processing apparatus 51 receives the HTTP Get command, the external application section 54 analyzes the Get command and generates HTML data indicative of an image data selection window requested. Then, the first web server section 53 sends, as an HTTP response to the multifunction printer 21, the generated HTML data indicative of the image data selection window requested (S52).

In accordance with the HTML data thus received, the web browser section 5 of the multifunction printer 21 causes the display section 10 to display the image data selection window for designating print data. The user enters, into the image data selection window, the name of a folder in which image data to be printed (referred to also as print data or specific image data) has been stored and the file name of the print data. The web browser section 5 sends to the information processing apparatus 51 an HTTP Get command, containing the folder name and file name thus entered, which requests printing of the print data (S53).

When the first web server section 53 of the information processing apparatus 51 receives the HTTP Get command sent in S53, the external application section 54 analyzes the Get command, and reads out the requested print data from the storage section. The first web server section 53 sends, to the multifunction printer 21, an HTTP response which includes an instruction to print the print data thus read out and which changes an address to be accessed to that of the second web server section 8 in the multifunction printer 21 with use of HTTP redirect (S54). In the HTTP response, a loop-back address is designated as the changed address to be accessed.

When the web browser section 5 receives the HTTP response, the web browser section 5 recognizes that the HTTP response is a response using HTTP redirect, so that the web browser section 5 accesses the second web server section 8 which is an access destination (here, loop-back address) indicated by the response, without causing the display section 10 to display a window. Further, the web browser section 5 sends print data included in the received HTTP response and an HTTP request for printing the print data to the second web server section 8 (S55).

When receiving the HTTP request, the second web server section 8 starts the control application section 23 and causes a process corresponding to the notification to be executed. Specifically, the control application section 23 generates a control command for causing a process of printing the print data forwarded from the web browser section 5 to be executed, and sends the control command to the device control section 7 (S56).

Then, the device control section 7 executes a printing process in accordance with the control command. Specifically, the device control section 7 controls the image forming section 3 so that the print data is sent to the image forming section 3 and an image indicated by the print data is formed on a sheet of paper.

When the printing process is completed, the device control section 7 notifies the control application section 23 of completion of the printing process (S57). When the control application section 23 is notified of the completion of the printing process, the control application section 23 sends, to the web browser section 5, an HTTP response to the HTTP request in S55 which response changes an address to be accessed to that of the first web server section 53 of the information processing apparatus 51 with use of HTTP redirect and requests a completion window. The web browser section 5 recognizes the HTTP response as a response using HTTP redirect, and forwards the HTTP response to the information processing apparatus 51 which is the changed access destination, without causing the display section 10 to display a window (S58).

When the first web server section 53 of the information processing apparatus 51 receives the response forwarded from the web browser section 5, the external application section 54 analyses the response, generates HTML data indicative of a completion window, and sends the HTML data to the multifunction printer 21 (S59). Thus, the web browser section 5 of the multifunction printer 21 can cause the display section 10 to display the completion window.

As described above, in this specific example 5, the web browser section 5 causes the display section 10 to display an image data selection window for specifying image data to be printed. Then, upon entry in the image data selection window of specifying information (folder name and file name) for specifying the image data, the web browser section 5 considers that an instruction to print an image indicated by print data (specified window data) indicated by the specifying information is entered as a control instruction, and sends to the first web server section 53 an HTTP request including a request to print the image indicated by the print data indicated by the specifying information. Thereafter, the web browser section 5 receives, from the first web server section 53, an HTTP response including an instruction to change an address to be accessed to that of the second web server section 8 with use of HTTP redirect, the print data indicated by the specifying information, and an instruction to print the image indicated by the print data, as a response to the HTTP request. Accordingly, the web browser section 5 can notify the second web server section 8 of the print data and the printing instruction by accessing the second web server section 8 in accordance with the received HTTP response. Consequently, the device control section 7 can control the image forming section 3 so that the image indicated by the print data is printed on a recording sheet, in accordance with the print data and the printing instruction sent from the web browser section 5 to the second web server section 8.

The present invention is not limited to the description of the embodiments above, but may be altered by a skilled person within the scope of the claims. An embodiment based on a proper combination of technical means disclosed in different embodiments is encompassed in the technical scope of the present invention.

Finally, the blocks of the multifunction printer 21 and the information processing apparatus 51 may be realized by way of hardware or software as executed by a CPU as follows:

The multifunction printer 21 and the information processing apparatus 51 include a CPU (central processing unit) which executes instructions in control programs, a ROM (read only memory) which contains the programs, a RAM (random access memory) to which the programs are loaded, and a storage device (storage medium) such as a memory containing the programs and various data. The objective of the present invention can also be achieved by mounting to the multifunction printer 21 and the information processing apparatus 51 a computer-readable recording medium containing control program code (executable program, intermediate code program, or source program), which is software realizing the aforementioned functions, in order for the computer (or CPU, MPU) to retrieve and execute the program code contained in the recording medium.

The recording medium may be, for example, a tape, such as a magnetic tape or a cassette tape; a magnetic disk, such as a Floppy® disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The multifunction printer 21 and the information processing apparatus 51 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth®, 802.11 wireless, HDR, mobile telephone network, satellite line, or terrestrial digital network.

As described above, the multifunction printer of the present invention is a multifunction printer, which communicates via a communications network with an information processing apparatus including a first web server section which operates in accordance with software for a web server, the multifunction printer comprising: a web browser section for operating in accordance with software for a web browser; and a second web server section for operating in accordance with software for a web server, the web browser section receiving, from the first web server section, control information for notifying the second web server section of a control instruction to control the multifunction printer, and upon reception of the control information from the first web server section, the web browser section carrying out a notification process of notifying the second web server section of the control instruction, the multifunction printer further comprising a control section for controlling the multifunction printer in accordance with the control instruction received by the second web server section.

With the arrangement, the control section is only required to receive the control instruction from the second web server section in the multifunction printer, and is not required to receive the control instruction from the first web server section of the information processing apparatus. Since both of the control section and the second web server section are provided in the multifunction printer, a firewall is not constructed between the control section and the second web server section. Consequently, the information processing apparatus can control the multifunction printer even when a firewall is constructed at a communications network between the multifunction printer and the information processing apparatus.

It is preferable to arrange the multifunction printer of the present invention so as to further include a display section, the web browser section carrying out the notification process in such a manner that the web browser section causes the display section to display an operation window indicated by window data retrieved from the first web server section and when the control instruction is entered into the operation window, the web browser section notifies the second web server section of the control instruction.

With the arrangement, the web browser section of the multifunction printer receives image data indicative of the operation window from the first web server section of the information processing apparatus. Then, the web browser section notifies the second web server section of a control instruction to control a function of the multifunction printer which instruction is entered into the operation window, and the device control section controls the function of the multifunction printer in accordance with the control instruction. Accordingly, the device control section is only required to receive the control instruction from the second web server section in the multifunction printer, and is not required to receive the control instruction from the first web server section of the information processing apparatus. Since both of the device control section and the second web server section are provided in the multifunction printer, a firewall is not constructed between the device control section and the second web server section. Consequently, even when a firewall is constructed at a communications network between the multifunction printer and the information processing apparatus, the multifunction printer can retrieve image data indicative of the operation window from the information processing apparatus, and it is possible to control the function of the multifunction printer via the operation window. Further, since the image data indicative of the operation window is stored in the information processing apparatus, editing the image data stored in the information processing apparatus allows easily changing the operation window displayed by the multifunction printer.

A method for notifying the second web server section of the control instruction to control a function of the multifunction printer may be a method used in a generally used web browser and web server, such as a loop-back address mentioned later. Consequently, a generally used web server and web browser can be used as software for the first and second web server sections and the web browser section. Further, even if the generally used web server and web browser which are the software for the first and second web server sections and the web browser section are upgraded or changed, it is unnecessary to uniquely extend the software.

Further, it is preferable to arrange the multifunction printer of the present invention so that the web browser section (a) sends to the first web server section an HTTP request for the operation window, (b) receives, as a response to the HTTP request, a first HTTP response including window data in which a loop-back address is set as an address to be accessed when the control instruction is entered into the operation window, and (c) upon entry of the control instruction into the operation window, accesses the second web server section so as to notify the second web server section of the control instruction thus entered.

Alternatively, the multifunction printer of the present invention may be arranged such that upon entry of the control instruction into the operation window, the web browser section sends to the first web server section an HTTP request indicating that the control instruction is entered, receives, from the first web server section, a response to the HTTP request which response is a first HTTP response including an instruction to change an address to be accessed to that of the second web server section with use of HTTP redirect and the control instruction, and accesses the second web server section in accordance with the first HTTP response thus received so as to notify the second web server section of the control instruction.

With the arrangements, by using a publicly known loop-back address or a function of HTTP redirect, it is easy for the web browser section to notify the second web server section of a control instruction to control a function of the multifunction printer which instruction is entered into the operation window. Since the publicly known loop-back address and the function of HTTP redirect can be recognized by a generally used web browser and web server, it is possible to use the generally used web server and web browser as the software for the first and second web server sections and the web browser section. Further, even if the generally used web server and web browser which are the software for the first and second web server sections and the web browser section are upgraded or changed, it is unnecessary to uniquely extend the software.

Further, it is preferable to arrange the multifunction printer of the present invention such that when the second web server section receives the control instruction from the web browser section, the second web server section sends, to the web browser section, a response to the control instruction which response is a second HTTP response including (i) an instruction to change an address to be accessed to that of the first web server section with use of HTTP redirect and (ii) a request for a control start window indicative of start of a control corresponding to the control instruction, and when the web browser section receives the second HTTP response, the web browser section requests the first web server section to send the control start window, and causes a display section to display the control start window received from the first web server section.

With the arrangement, the operation window and the control start window are sent from the first web server section to the web browser section. This indicates that the first web server section can centralizedly control windows to be displayed by the multifunction printer. Accordingly, by designing the first web server section such that the same application is used for generating image data indicative of the operation window and image data indicative of the control start window, it is possible to use the same format for the operation window and the control start window. Consequently, a user views images in the same format, so that the user is free from an uncomfortable feeling caused by different formats depending on images.

The multifunction printer of the present invention so as to further include: an image reading section for reading an image from a document; and an image forming section for printing on a sheet of paper an image indicated by input image data, the control instruction being one of an instruction to cause the image reading section to start reading of an image, an instruction to cause the image forming section to start printing, and an instruction to restrict a function of at least one of the image reading section and the image forming section.

With the arrangement, at least one of (i) the image reading section reading an image, (ii) the image forming section printing an image, and (iii) restricting a function of at least one of the image reading section and the image forming section can be easily carried out by entering an instruction into the operation window received from the information processing apparatus.

Further, the multifunction printer of the present invention may be arranged so as to further include an image reading section for reading an image from a document, the web browser section causing the display section to display the operation window and notifying the second web server section of the control instruction, the operation window being a scan start operation window for receiving a start instruction for the image reading section to start a reading operation, and the control instruction being the start instruction for the image reading section to start the reading operation, and the control section causing the image reading section to start to operate, in accordance with the start instruction for the image reading section to start the reading operation, of which the web browser section notifies the second web server section. This enables the multifunction printer to scan.

Further, the multifunction printer of the present invention may be arranged so as to further include: an image reading section for reading an image from a document; and an image forming section for printing on a sheet of paper an image indicated by input image data, the web browser section causing the display section to display the operation window, the operation window being an authentication information entry window that prompts a user to enter authentication information for user authentication, furthermore, upon entry of authentication information into the authentication information entry window, the web browser section (a) considering that a restriction instruction to restrict a function of at least one of the image reading section and the image forming section, which function corresponds to a user indicated by the authentication information, is entered as the control instruction, (b) sending an HTTP request including the authentication information and the restriction instruction to the first web server section, (c) receiving, from the first web server section, a response to the HTTP request which response is an HTTP response including (i) an instruction to change an address to be accessed to that of the second web server section with use of HTTP redirect and (ii) the restriction instruction, and (d) accessing the second web server section in accordance with the received HTTP response so as to notify the second web server section of the restriction instruction, and the control section restricting the function of at least one of the image reading section and the image forming section in accordance with the restriction instruction of which the web browser section notifies the second web server section.

With the arrangement, it is possible to prohibit color copying or to restrict the number of copies to 100.

Further, the multifunction printer of the present invention may be arranged so as to further include: an image forming section for printing on a sheet of paper an image indicated by input image data, the web browser section causing the display section to display the operation window, the operation window being an image data selection window for specifying image data to be printed, furthermore, upon entry of specifying information for specifying image data into the image data selection window, the web browser section (a) considering that an instruction to print an image indicated by specified image data indicated by the specifying information is entered as the control instruction, (b) sending, to the first web server section, an HTTP request including a request for the image data indicated by the specifying information, (c) receiving, from the first web server section, a response to the HTTP request which response is an HTTP response including (i) an instruction to change an address to be accessed to that of the second web server section with use of HTTP redirect, (ii) the specified image data indicated by the specifying information, and (iii) a print instruction to print the image indicated by the specified image data, and (d) accessing the second web server section in accordance with the received HTTP response so as to notify the second web server section of the specified image data and the print instruction, and the control section controlling the image forming section so that the image forming section prints the image indicated by the specified image data on a recording sheet in accordance with the specified image data and the print instruction of which the web browser section notifies the second web server section.

With the arrangement, only by storing specified image data in a predetermined folder in advance, it is possible for a plurality of multifunction printers to print on a recording sheet an image specified by the specified image data.

Further, the multifunction printer of the present invention may be arranged so as to further include a display section, the web browser section sending the control instruction to the second web server section, the control instruction being a transmission instruction to transmit unique information indicative of a performance of the multifunction printer, the control section controlling the web browser section so that the web browser section sends the unique information to the first web server section in accordance with the transmission instruction, and the web browser section receiving, from the first web server section, data indicative of an operation window generated in accordance with the unique information which the control section causes the first web server section to transmit, and the web browser section causing the display section to display the operation window.

With the arrangement, by designing the second web server section to include unique information such as the degree of reading resolution, an external application running on the first web sever section, which application is used for generating the operation window, may have versatility regardless of the model of the multifunction printer. Further, since the operation window is generated based on the unique information, it is easy to cause the multifunction printer to display the operation window corresponding to the model of the multifunction printer.

A multifunction printer control system of the present invention includes: an information processing apparatus including a first web server section which operates in accordance with software for a web server; and a multifunction printer connected via a communications network with the information processing apparatus, the multifunction printer comprising: a web browser section for operating in accordance with software for a web browser; and a second web server section for operating in accordance with software for a web server, the web browser section receiving, from the first web server section, control information for notifying the second web server section of a control instruction to control the multifunction printer, and upon reception of the control information from the first web server section, the web browser section carrying out a notification process of notifying the second web server section of the control instruction, the multifunction printer further comprising a control section for controlling the multifunction printer in accordance with the control instruction received by the second web server section.

With the arrangement, even when a firewall is constructed between the information processing apparatus and the multifunction printer, the information processing apparatus can control the multifunction printer.

It is preferable to arrange the multifunction printer control system of the present invention such that the multifunction printer further includes a display section, the web browser section carrying out the notification process in such a manner that the web browser section causes the display section to display an operation window indicated by window data retrieved from the first web server section and when the control instruction is entered into the operation window, the web browser section notifies the second web server section of the control instruction.

With the arrangement, it is possible to control the multifunction printer via the operation window received from the information processing apparatus even when a firewall is constructed between the information processing apparatus and the multifunction printer, and it is also possible to easily customize the operation window.

Further, the multifunction printer control system of the present invention may be arranged such that the web browser section sends an HTTP request for the operation window to the first web server section, the first web server section sends, to the web browser section, a response to the HTTP request which response is an HTTP response including image data in which a loop-back address is set as an address to be accessed when the control instruction is entered into the operation window, and the web browser section causes the display section to display an operation window indicated by the image data in accordance with the HTTP response, and upon entry of the control instruction into the operation window, the web browser section accesses the second web server section so as to notify the second web server section of the control instruction.

Alternatively, the multifunction printer control system of the present invention may be arranged such that upon entry of the control instruction into the operation window, the web browser section sends, to the first web server section, an HTTP request indicating that the control instruction is entered, the first web server section sends, to the web browser section, a response to the HTTP request which response is an HTTP response including (i) an instruction to change an address to be accessed to that of the second web server section with use of HTTP redirect and (ii) the control instruction, and upon reception of the HTTP response, the web browser section accesses the second web server section in accordance with the HTTP response so as to notify the second web server section of the control instruction.

With the arrangements, by using a publicly known loop-back address or a function of HTTP redirect, it is easy for the web browser section to notify the second web server section of a control instruction to control a function of the multifunction printer which instruction is entered into the operation window. Further, the generally used web server and web browser may be used as the software for the first and second web server sections and the web browser section. Further, even if the generally used web server and web browser which are the software for the first and second web server sections and the web browser section are upgraded or changed, it is unnecessary to uniquely extend the software.

The multifunction printer may be realized by a computer. In this case, a program for causing the computer to function as the sections of the multifunction printer, and a computer-readable storage medium in which the program is stored, are also encompassed in the scope of the present invention.

INDUSTRIAL APPLICABILITY

The present invention is applicable to a multifunction printer having a plurality of functions such as copying, scanning, and FAX.

REFERENCE SIGNS LIST

2: image reading section
3: image forming section
4: operation section
5: web browser section
7: device control section (control section)
8: second web server section
10: display section
11: input section
21: multifunction printer
22: second communication section
23: control application section (control section)
50: communications network
51: information processing apparatus
52: first communication section
53: first web server section
54: external application section
71: Open I/F section

The invention claimed is:

1. A multifunction printer, which communicates via a communications network with an information processing apparatus including a first web server section which operates in accordance with software for a web server, the multifunction printer comprising:

a web browser section for operating in accordance with software for a web browser;

a second web server section for operating in accordance with software for a web server, the web browser section sending a hypertext transfer protocol (HTTP) request to the first web server section and receiving, from the first web server section, as a response to the HTTP request, an HTTP response including control information for notifying the second web server section of a control instruction to control the multifunction printer, and upon reception of the HTTP response from the first web server section, the web browser section carrying out a notification process of notifying the second web server section of a control instruction corresponding to the control information included in the HTTP response, the multifunction printer further comprising a control section for controlling the multifunction printer in accordance with the control instruction received by the second web server section, wherein the multifunction printer is located on an opposite side of a firewall from the information processing apparatus and the control information is exchanged between the multifunction printer and the information processing apparatus without having to change firewall settings;

a display section, the web browser section carrying out the notification process in such a manner that the web browser section causes the display section to display an operation window indicated by window data retrieved from the first web server section and when the control instruction is entered into the operation window, the web browser section notifies the second web server section of the control instruction;

an image reading section for reading an image from a document; and an image forming section for printing on a sheet of paper an image indicated by input image data:

the web browser section causing the display section to display the operation window, the operation window being an authentication information entry window that prompts a user to enter authentication information for user authentication, furthermore, upon entry of authentication information into the authentication information entry window, the web browser section (a) considering that a restriction instruction to restrict a function of at least one of the image reading section and the image forming section, which function corresponds to a user indicated by the authentication information, is entered as the control instruction, (b) sending an HTTP request including the authentication information and the restriction instruction to the first web server section, (c) receiving, from the first web server section, a response to the HTTP request which response is an HTTP response including (i) an instruction to change an address to be accessed to that of the second web server section with use of HTTP redirect and (ii) the restriction instruction, and (d) accessing the second web server section in accordance with the received HTTP response so as to notify the second web server section of the restriction instruction, and the control section restricting the function of at least one of the image reading section and the image forming section in accordance with the restriction instruction of which the web browser section notifies the second web server section.

2. The multifunction printer as set forth in claim 1, wherein the web browser section (a) sends to the first web server section an HTTP request for the operation window, (b) receives, as a response to the HTTP request, a first HTTP response including window data in which a loop-back address is set as an address to be accessed when the control instruction is entered into the operation window, and (c) upon entry of the control instruction into the operation window, accesses the second web server section so as to notify the second web server section of the control instruction thus entered.

3. The multifunction printer as set forth in claim 1, wherein upon entry of the control instruction into the operation window, the web browser section sends to the first web server section an HTTP request indicating that the control instruction is entered, receives, from the first web server section, a response to the HTTP request which response is a first HTTP response including an instruction to change an address to be accessed to that of the second web server section with use of HTTP redirect and the control instruction, and accesses the second web server section in accordance with the first HTTP response thus received so as to notify the second web server section of the control instruction.

4. The multifunction printer as set forth in claim 1,
wherein the web browser section causes the display section to display the operation window and notifying the second web server section of the control instruction, the operation window being a scan start operation window for receiving a start instruction for the image reading section to start a reading operation, and the control instruction being the start instruction for the image reading section to start the reading operation, and the control section causes the image reading section to start to operate, in accordance with the start instruction for the image reading section to start the reading operation, of which the web browser section notifies the second web server section.

5. The multifunction printer as set forth in claim 1, wherein when the second web server section receives the control instruction from the web browser section, the second web server section sends, to the web browser section, a response to the control instruction which response is a second HTTP response including (i) an instruction to change an address to be accessed to that of the first web server section with use of HTTP redirect and (ii) a request for a control start window indicative of start of a control corresponding to the control instruction, and when the web browser section receives the second HTTP response, the web browser section requests the first web server section to send the control start window, and causes a display section to display the control start window received from the first web server section.

6. The multifunction printer as set forth in claim 1,
wherein the control instruction being one of an instruction to cause the image reading section to start reading of an image, an instruction to cause the image forming section to start printing, and an instruction to restrict a function of at least one of the image reading section and the image forming section.

7. The multifunction printer as set forth in claim 1, wherein the web browser section sends the control instruction to the second web server section, the control instruction being a transmission instruction to transmit unique information indicative of a performance of the multifunction printer, the control section controls the web browser section so that the web browser section sends the unique information to the first web server section in accordance with the transmission instruction, and the web browser section receives from the first web server section, data indicative of an operation window generated in accordance with the unique information which the control section causes the web browser section to transmit, and the web browser section causing the display section to display the operation window.

8. A multifunction printer, which communicates via a communications network with an information processing apparatus including a first web server section which operates in accordance with software for a web server, the multifunction printer comprising:

a web browser section for operating in accordance with software for a web browser;

a second web server section for operating in accordance with software for a web server, the web browser section sending a hypertext transfer protocol (HTTP) request to the first web server section and receiving, from the first web server section, as a response to the HTTP request, an HTTP response including control information for notifying the second web server section of a control instruction to control the multifunction printer, and upon reception of the HTTP response from the first web server section, the web browser section carrying out a notification process of notifying the second web server section of a control instruction corresponding to the control information included in the HTTP response, the multifunction printer further comprising a control section for controlling the multifunction printer in accordance with the control instruction received by the second web server section, wherein the multifunction printer is located on an opposite side of a firewall from the information processing apparatus and the control information is exchanged between the multifunction printer and the information processing apparatus without having to change firewall settings;

a display section, the web browser section carrying out the notification process in such a manner that the web browser section causes the display section to display an operation window indicated by window data retrieved from the first web server section and when the control instruction is entered into the operation window, the web browser section notifies the second web server section of the control instruction; and an image forming section for printing on a recording sheet an image indicated by input image data, the web browser section causing the display section to display the operation window, the operation window being an image data selection window for specifying image data to be printed, furthermore, upon entry of specifying information for specifying image data into the image data selection window, the web browser section (a) considering that an instruction to print an image indicated by specified image data indicated by the specifying information is entered as the control instruction, (b) sending, to the first web server section, an HTTP request including a request for the image data indicated by the specifying information, (c) receiving, from the first web server section, a response to the HTTP request which response is an HTTP response including (i) an instruction to change an address to be accessed to that of the second web server section with use of HTTP redirect, (ii) the specified image data indicated by the specifying information, and (iii) a print instruction to print the image indicated by the specified image data, and (d) accessing the second web server section in accordance with the received HTTP response so as to notify the second web server section of the specified image data and the print instruction, and the control section controlling the image forming section so that the image forming section prints the image indicated by the specified image data on a recording sheet in accordance with the specified image data and the print instruction of which the web browser section notifies the second web server section.

9. A multifunction printer control system, comprising:

an information processing apparatus including a first web server section which operates in accordance with software for a web server; and a multifunction printer connected via a communications network with the information processing apparatus, the multifunction printer comprising:

a web browser section for operating in accordance with software for a web browser;

a second web server section for operating in accordance with software for a web server, the web browser section sending a hypertext transfer protocol (HTTP) request to the first web server section and receiving, from the first web server section, as a response to the HTTP request, an HTTP response including control information for notifying the second web server section of a control instruction to control the multifunction printer, and upon reception of the HTTP response from the first web server section, the web browser section carrying out a notification process of notifying the second web server section of a control instruction corresponding to the control information included in the HTTP response, the multifunction printer further comprising a control section for controlling the multifunction printer in accordance with the control instruction received by the second web server section, wherein the multifunction printer is located on an opposite side of a firewall from the information processing apparatus and the control information is exchanged between the multifunction printer and the information processing apparatus without having to change firewall settings;

a display section, the web browser section carrying out the notification process in such a manner that the web browser section causes the display section to display an operation window indicated by window data retrieved from the first web server section and when the control instruction is entered into the operation window, the web browser section notifies the second web server section of the control instruction;

an image reading section for reading an image from a document; and an image forming section for printing on a sheet of paper an image indicated by input image data;

the web browser section causing the display section to display the operation window, the operation window being an authentication information entry window that prompts a user to enter authentication information for user authentication, furthermore, upon entry of authentication information into the authentication information entry window, the web browser section (a) considering that a restriction instruction to restrict a function of at least one of the image reading section and the image forming section, which function corresponds to a user indicated by the authentication information, is entered as the control instruction, (b) sending an HTTP request including the authentication information and the restriction instruction to the first web server section, (c) receiving, from the first web server section, a response to the HTTP request which response is an HTTP response including (i) an instruction to change an address to be accessed to that of the second web server section with use of HTTP redirect and (ii) the restriction instruction, and (d) accessing the second web server section in accordance with the received HTTP response so as to notify the second web server section of the restriction instruction, and the control section restricting the function of at least one of the image reading section and the image forming section in accordance with the restriction instruction of which the web browser section notifies the second web server section.

10. The multifunction printer control system as set forth in claim 9, wherein the web browser section sends an HTTP request for the operation window to the first web server section, the first web server section sends, to the web browser section, a response to the HTTP request which response is an HTTP response including image data in which a loop-back address is set as an address to be accessed when the control instruction is entered into the operation window, and the web browser section causes the display section to display an operation window indicated by the image data in accordance with the HTTP response, and upon entry of the control instruction into the operation window, the web browser section accesses the second web server section so as to notify the second web server section of the control instruction.

11. The multifunction printer control system as set forth in claim 9, wherein upon entry of the control instruction into the operation window, the web browser section sends, to the first web server section, an HTTP request indicating that the control instruction is entered, the first web server section sends, to the web browser section, a response to the HTTP request which response is an HTTP response including (i) an instruction to change an address to be accessed to that of the second web server section with use of HTTP redirect and (ii) the control instruction, and upon reception of the HTTP response, the web browser section accesses the second web server section in accordance with the HTTP response so as to notify the second web server section of the control instruction.

12. A non-transitory computer-readable storage medium in which a program for causing a computer to function as the sections of the multifunction printer as set forth in claim 1 is stored.

* * * * *